US012236625B2

(12) United States Patent
Baek et al.

(10) Patent No.: US 12,236,625 B2
(45) Date of Patent: Feb. 25, 2025

(54) POLKA LINES: LEARNING STRUCTURED ILLUMINATION AND RECONSTRUCTION FOR ACTIVE STEREO

(71) Applicant: THE TRUSTEES OF PRINCETON UNIVERSITY, Princeton, NJ (US)

(72) Inventors: Seung-Hwan Baek, Princeton, NJ (US); Felix Heide, Princeton, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 393 days.

(21) Appl. No.: 17/850,321

(22) Filed: Jun. 27, 2022

(65) Prior Publication Data

US 2022/0414913 A1    Dec. 29, 2022

Related U.S. Application Data

(63) Continuation-in-part of application No. PCT/IB2022/052448, filed on Mar. 17, 2022.
(Continued)

(51) Int. Cl.
*G06T 7/593* (2017.01)
*G06T 7/521* (2017.01)
*G06V 10/60* (2022.01)

(52) U.S. Cl.
CPC ............. *G06T 7/593* (2017.01); *G06T 7/521* (2017.01); *G06V 10/60* (2022.01)

(58) Field of Classification Search
CPC ................... G06T 7/593; G06T 7/521; G06T 2207/20081; G06T 2207/20084;
(Continued)

(56) References Cited

U.S. PATENT DOCUMENTS

2021/0241475 A1*  8/2021  Kutulakos ............ H04N 13/254

FOREIGN PATENT DOCUMENTS

GB        2598711 A  *  3/2022  ........... G06K 9/6256

OTHER PUBLICATIONS

Mulligan, J., Isler, V. & Daniilidis, K. Trinocular Stereo: A Real-Time Algorithm and its Evaluation. International Journal of Computer Vision 47, 51-61 (2002) (Year: 2002).*
(Continued)

*Primary Examiner* — Ping Y Hsieh
*Assistant Examiner* — Vaisali Rao Koppolu
(74) *Attorney, Agent, or Firm* — Ajay A. Jagtiani; Miles & Stockbridge P.C.

(57) ABSTRACT

The present disclosure relates generally to image processing, and more particularly, toward techniques for structured illumination and reconstruction of three-dimensional (3D) images. Disclosed herein is a method to jointly learn structured illumination and reconstruction, parameterized by a diffractive optical element and a neural network in an end-to-end fashion. The disclosed approach has a differentiable image formation model for active stereo, relying on both wave and geometric optics, and a trinocular reconstruction network. The jointly optimized pattern, dubbed "Polka Lines," together with the reconstruction network, makes accurate active-stereo depth estimates across imaging conditions. The disclosed method is validated in simulation and used with an experimental prototype, and several variants of the Polka Lines patterns specialized to the illumination conditions are demonstrated.

19 Claims, 17 Drawing Sheets
(17 of 17 Drawing Sheet(s) Filed in Color)

Related U.S. Application Data

(60) Provisional application No. 63/214,879, filed on Jun. 25, 2021.

(58) Field of Classification Search
CPC ...... G06T 7/596; G06V 10/60; G06V 10/774; G06V 10/147
See application file for complete search history.

(56) References Cited

OTHER PUBLICATIONS

Sitzmann, V., Diamond, S., Peng, Y., Dun, X., Boyd, S., Heidrich, W., . . . & Wetzstein, G. (2018). End-to-end optimization of optics and image processing for achromatic extended depth of field and super-resolution imaging. ACM Transactions on Graphics (TOG), 37(4), 1-13 (Year: 2018).*
Intel® RealSenseTMDepthCameraD415 https://www.intelrealsense.com/depth-camera-d415/ Accessed Jun. 20, 2020.
Udepth:Real-time3ddepthsensingonthepixel4.Accessed Sep. 19, 2020.
Martin Abadi et al., "Tensor-Flow: Large-scale machine learning on heterogeneous systems", Preliminary White Paper, 2015.
Supreeth Achar, Joseph R Bartels, William L'Red' Whit-taker, Kiriakos N Kutulakos, and Srinivasa G Narasimhan. Epipolar time-of-flight imaging. ACM Transactions on Graphics (ToG), 36(4):1-8, 2017.
Brian F. Aull, Andrew H. Loomis, Douglas J. Young, Richard M. Heinrichs, Bradley J. Felton, Peter J. Daniels, and Deborah J. Landers. Geiger-mode avalanche photodi-odes for three-dimensional imaging. 13(2):335-349, 2002.
Seung-Hwan Baek, Diego Gutierrez, and Min H Kim. Bire-fractive stereo imaging for single-shot depth acquisition. ACM Transactions on Graphics, 35(6):194, 2016.
Michael Bleyer, Christoph Rhemann, and Carsten Rother. Patchmatch stereo-stereo matching with slanted support win-dows. In Bmvc, vol. 11, pp. 1-11, 2011.
Ayan Chakrabarti. Learning sensor multiplexing design through back-propagation. In Advances in Neural Informa-tion Processing Systems, pp. 3081-3089, 2016.
Julie Chang and Gordon Wetzstein. Deep optics for monoc-ular depth estimation and 3d object detection. In IEEE Inter-national Conference on Computer Vision (ICCV), 2019.
H Dammann and K Görtler. High-efficiency in-line multi-ple imaging by means of multiple phase holograms. Optics communications, 3(5):312-315, 1971.
Pei-QinDu, Hsi-FuShih, Jenq-ShyongChen, andYi-Shiang Wang. Design and verification of diffractive optical elements for speckle generation of 3-d range sensors. Optical Review, 23(6):1017-1025, 2016.
Sean Ryan Fanello, Julien Valentin, Christoph Rhemann, Adarsh Kowdle, Vladimir Tankovich, Philip Davidson, and Shahram Izadi. Ultrastereo: Efficient learning-based match-ing for active stereo systems. In 2017 IEEE Conference on Computer Vision and Pattern Recognition (CVPR), pp. 6535-6544. IEEE, 2017.
Clement Godard, Oisin Mac Aodha, and Gabriel J Brostow. Unsupervised monocular depth estimation with left-right consistency. In Proceedings of the IEEE Conference on Computer Vision and Pattern Recognition, pp. 270-279, 2017.
Joseph W Goodman. Introduction to Fourier optics. Roberts and Company Publishers, 2005.
Tobias Gruber, Frank Julca-Aguilar, Mario Bijelic, and Felix Heide. Gated2depth: Real-time dense lidar from gated images. In Proceedings of the IEEE International Conference on Computer Vision, pp. 1506-1516, 2019.
Mohit Gupta, Qi Yin, and Shree K Nayar. Structured light in sunlight. In Proceedings of the IEEE International Conference on Computer Vision, pp. 545-552, 2013.
Harel Haim, Shay Elmalem, Raja Giryes, Alex M Bronstein, and Emanuel Marom. Depth estimation from a single image using deep learned phase coded mask. IEEE Transactions on Computational Imaging, 4(3):298-310, 2018.
Miles Hansard, Seungkyu Lee, Ouk Choi, and Radu Patrice Horaud. Time-of-flight cameras: principles, methods and applications. Springer Science & Business Media, 2012.
Felix Heide, Steven Diamond, David B Lindell, and Gordon Wetzstein. Sub-picosecond photon-efficient 3d imaging using single-photon sensors. Scientific reports, 8(1):1-8, 2018.
Felix Heide, Wolfgang Heidrich, Matthias Hullin, and Gordon Wetzstein. Doppler time-of-flight imaging. ACM Trans-actions on Graphics (ToG), 34(4):1-11, 2015.
Steven Hickson, Stan Birchfield, Irfan Essa, and Henrik Christensen. Efficient hierarchical graph-based segmentation of RGBD videos. pp. 344-351, 2014.
Heiko Hirschmuller. Stereo processing by semiglobal matching and mutual information. IEEE Transactions on pattern analysis and machine intelligence, 30(2):328-341, 2007.
Shahram Izadi, David Kim, Otmar Hilliges, David Molyneaux, Richard Newcombe, Pushmeet Kohli, Jamie Shotton, Steve Hodges, Dustin Freeman, Andrew Davison, et al. Kinectfusion: real-time 3D reconstruction and inter-action using a moving depth camera. In Proceedings of the 24th annual ACM symposium on User interface software and technology, pp. 559-568, 2011.
Kaizhang Kang, Cihui Xie, Chengan He, Mingqi Yi, Minyi Gu, Zimin Chen, Kun Zhou, and Hongzhi Wu. Learning efficient illumination multiplexing for joint capture of re-flectance and shape. ACM Trans. Graph., 38(6):165-1, 2019.
Andreas Kolb, Erhardt Barth, Reinhard Koch, and Rasmus Larsen. Time-of-flight cameras in computer graphics. In Computer Graphics Forum, vol. 29, pp. 141-159. Wi-ley Online Library, 2010.
Adarsh Kowdle, Christoph Rhemann, Sean Fanello, Andrea Tagliasacchi, Jonathan Taylor, Philip Davidson, Mingsong Dou, Kaiwen Guo, Cem Keskin, Sameh Khamis, et al. The need 4 speed in real-time dense visual tracking. ACM Trans-actions on Graphics (TOG), 37(6):1-14, 2018.
Robert Lange. 3D time-of-flight distance measurement with custom solid-state image sensors in CMOS/CCD-technology. 2000.
Anat Levin, Rob Fergus, Fredo Durand, and William T Free-man. Image and depth from a conventional camera with a coded aperture. ACM transactions on graphics (TOG), 26(3):70-es, 2007.
Julio Marco, Quercus Hernandez, Adolfo Muñoz, Yue Dong, Adrian Jarabo, Min H Kim, Xin Tong, and Diego Gutierrez. Deeptof: off-the-shelf real-time correction of multipath interference in time-of-flight imaging. ACM Transactions on Graphics (ToG), 36(6):1-12, 2017.
Manuel Martinez and Rainer Stiefelhagen. Kinect un-leashed: Get-ting control over high resolution depth maps. In MVA, pp. 247-250, 2013.
N. Mayer, E. Ilg, P. Haüsser, P. Fischer, D. Cremers, A. Dosovitskiy, and T. Brox. A large dataset to train con-volutional networks for disparity, optical flow, and scene flow estimation. In IEEE International Conference on Computer Vision and Pattern Recognition (CVPR), 2016. arXiv:1512.02134.
C. Metzler, H. Ikoma, Y. Peng, and G. Wetzstein. Deep op-tics for single-shot high-dynamic-range imaging. In Proc. CVPR, 2020.
Andreas Meuleman, Seung-Hwan Baek, Felix Heide, and Min H. Kim. Single-shot monocular rgb-d imaging using uneven double refraction. In The IEEE Conference on Com-puter Vision and Pattern Recognition (CVPR), Jun. 2020.
Yinxiao Miao, Yongshun Zhao, Huiping Ma, Minwei Jiang, Jie Lin, and Peng Jin. Design of diffractive optical element projector for a pseudorandom dot array by an improved en-coding method. Applied Optics, 58(34):G169-G176, 2019.
Elias Nehme, Daniel Freedman, Racheli Gordon, Boris Ferdman, Lucien E Weiss, Onit Alalouf, Reut Orange, Tomer Michaeli, and Yoav Shechtman. Deepstorm3d: dense three dimensional localization microscopy and point spread function design by deep learning. arXiv preprint arXiv:1906.09957v2, 2019.
Bingbing Ni, Gang Wang, and Pierre Moulin. RGBD-HuDaAct: A color-depth video database for human daily activity recognition. In Consumer Depth Cameras for Com-puter Vision, pp. 193-208. Springer, 2013.

(56) References Cited

OTHER PUBLICATIONS

Adam Paszke, Sam Gross, Soumith Chintala, Gregory Chanan, Edward Yang, Zachary DeVito, Zeming Lin, Al-ban Desmaison, Luca Antiga, and Adam Lerer. Automatic differentiation in pytorch. 2017.

Gernot Riegler, Yiyi Liao, Simon Donne, Vladlen Koltun, and Andreas Geiger. Connecting the dots: Learning repre-sentations for active monocular depth estimation. In Pro-ceedings of the IEEE Conference on Computer Vision and Pattern Recognition, pp. 7624-7633, 2019.

Sean Ryan Fanello, Christoph Rhemann, Vladimir Tankovich, Adarsh Kowdle, Sergio Orts Escolano, David Kim, and Shahram Izadi. Hyperdepth: Learning depth from structured light without match-ing. In Proceedings of the IEEE Conference on Computer Vision and Pattern Recognition, pp. 5441-5450, 2016.

Daniel Scharstein and Richard Szeliski. A taxonomy and evaluation of dense two-frame stereo correspondence algo-rithms. International journal of computer vision, 47(1-3):7-42, 2002.

Daniel Scharstein and Richard Szeliski. High-accuracy stereo depth maps using structured light. vol. 1, 2003.

John Sell and Patrick O'Connor. The xbox one system on a chip and kinect sensor. IEEE Micro, 34(2):44-53, 2014.

Vincent Sitzmann, Steven Diamond, Yifan Peng, Xiong Dun, Ste-phen Boyd, Wolfgang Heidrich, Felix Heide, and Gor-don Wetzstein. End-to-end optimization of optics and image processing for achro-matic extended depth of field and super-resolution imaging. ACM Transactions on Graphics (TOG), 37(4):114, 2018.

Shuran Song, Samuel P Lichtenberg, and Jianxiong Xiao. Sun rgb-d: A rgb-d scene understanding benchmark suite. In Proceedings of the IEEE conference on computer vision and pattern recognition, pp. 567-576, 2015.

Shuochen Su, Felix Heide, Gordon Wetzstein, and Wolfgang Heidrich. Deep end-to-end time-of-flight imaging. pp. 6383-6392, 2018.

Qilin Sun, Ethan Tseng, Qiang Fu, Wolfgang Heidrich, and Felix Heide. Learning rank-1 diffractive optics for single-shot high dynamic range imaging. IEEE CVPR, 2020.

Quilin Sun, Jian Zhang, Xiong Dun, Bernard Ghanem, Yifan peng, and Wolfgang Heidrich. End-to-end learned, optically coded super-resolution spad camera. ACM Transactions on Graphics (TOG), 39, 2020.

Jari Turunen and Frank Wyrowski. Diffractive optics for in-dustrial and commercial applications. 1998.

Ralf Vandenhouten, Andreas Hermerschmidt, and Richard Fiebelkorn. Design and quality metrics of point patterns for coded structured light illumination with diffractive optical el-ements in optical 3d sensors. In Digital Optical Technologies 2017, vol. 10335, p. 1033518. International Society for Optics and Photonics, 2017.

Lizhi Wang, Tao Zhang, Ying Fu, and Hua Huang. Hyper-reconnet: Joint coded aperture optimization and image re-construction for compressive hyperspectral imaging. IEEE Transactions on Image Processing, 28(5):2257-2270, May 2019.

George M. Williams. Optimization of eyesafe avalanche photodiode lidar for automobile safety and autonomous nav-igation systems. 56(3):1-9-9, 2017.

Jiamin Wu, Bo Xiong, Xing Lin, Jijun He, Jinli Suo, and Qionghai Dai. Snapshot hyperspectral volumetric mi-croscopy. Scientific Reports, 6:24624, 2016.

Yicheng Wu, Vivek Boominathan, Huaijin Chen, Aswin Sankaranarayanan, and Ashok Veeraraghavan. Phasecam3d-learning phase masks for passive single view depth estimation. In IEEE International Conference on Computational Photography (ICCP), pp. 1-12, 2019.

Yicheng Wu, Vivek Boominathan, Xuan Zhao, Jacob T Robinson, Hiroshi Kawasaki, Aswin Sankaranarayanan, and Ashok Veeraraghavan. Freecam3d: Snapshot structured light 3d with freely-moving cam-eras. In European Conference on Computer Vision, pp. 309-325. Springer, 2020.

Yinda Zhang, Sameh Khamis, Christoph Rhemann, Julien Valentin, Adarsh Kowdle, Vladimir Tankovich, Michael Schoenberg, Shahram Izadi, Thomas Funkhouser, and Sean Fanello. Activestereonet: End-to-end self-supervised learn-ing for active stereo systems. In Proceedings of the Euro-pean Conference on Computer Vision (ECCV), pp. 784-801, 2018.

Zhengyou Zhang. A flexible new technique for camera cali-bration. IEEE Transactions on pattern analysis and machine intelligence, 22(11):1330-1334, 2000.

Tinghui Zhou, Matthew Brown, Noah Snavely, and David G Lowe. Unsupervised learning of depth and ego-motion from video. In Proceedings of the IEEE Conference on Computer Vision and Pattern Recognition, pp. 1851-1858, 2017.

\* cited by examiner

POLKA LINES: LEARNING STRUCTURED ILLUMINATION AND RECONSTRUCTION FOR ACTIVE STEREO

CROSS-REFERENCE TO RELATED APPLICATIONS

This application claims benefit of priority of International Patent Application No. PCT/IB2022/052448 entitled, "MICROLENS AMPLITUDE MASKS FOR FLYING PIXEL REMOVAL IN TIME-OF-FLIGHT IMAGING" filed Mar. 17, 2022. This application also claims benefit of priority to U.S. Provisional Patent Application No. 63/214,879, entitled "Polka Lines: Learning Structured Illumination and Reconstruction for Active Stereo," filed Jun. 25, 2021. The entire contents and disclosures of these patent applications are incorporated herein by reference in their entirety.

BACKGROUND

Field of the Invention

The present disclosure relates generally to image processing, and more particularly, toward techniques for structured illumination and reconstruction of three-dimensional (3D) images.

Background of the Invention

Active depth cameras have become essential for three-dimensional scene reconstruction and scene understanding, with established and emerging applications across disciplines, including robotics, autonomous drones, navigation, driver monitoring, human-computer interaction, virtual and mixed reality, and remote conferencing. When combined with RGB cameras, depth-sensing methods have made it possible to recover high-fidelity scene reconstructions (23). Such RGB-D cameras also allowed researchers to collect large-scale RGB-D data sets that propelled work on fundamental computer vision problems, including scene understanding (44, 21) and action recognition (36). However, while depth cameras under controlled conditions with low ambient light and little object motion are becoming reliable (1, 42), depth imaging in strong ambient light, at long ranges, and for fine detail and highly dynamic scenes remains an open challenge.

A large body of work has explored active depth sensing approaches to tackle this challenge (18, 27, 4, 41), with structure light and time-of-flight cameras being the most successful methods. Pulsed time-of-flight sensors emit pulses of light into the scene and measure the travel time of the returned photons directly by employing sensitive silicon avalanche photo-diodes (51) or single-photon avalanche diodes (5). Although these detectors are sensitive to a single photon, their low fill factor restricts existing LiDAR sensors to point-by-point scanning with individual diodes, which prohibits the acquisition of dense depth maps. Correlation time-of-flight sensors (18, 25, 27) overcome this challenge by indirectly estimating round-trip time from the phase of temporally modulated illumination. Although these cameras provide accurate depth for indoor scenes, they suffer from strong ambient illumination and multi-path interference (45, 29), are limited to VGA resolution, and require multiple captures, which makes dynamic scenes a challenge. Active stereo (55, 1, 2) has emerged as the only low-cost depth sensing modality that has the potential to overcome these limitations of existing methods for room-sized scenes.

Active stereo cameras equip a stereo camera pair with an illumination module that projects a fixed pattern onto a scene so that, independently of surface texture, stereo correspondence can be reliably estimated. As such, active stereo methods allow for single-shot depth estimates at high resolutions using low-cost diffractive laser dot modules (1) and conventional CMOS sensors deployed in mass-market products including Intel RealSense cameras (1) and the Google Pixel 4 Phones (2). However, although active stereo has become a rapidly emerging depth-sensing technology, existing approaches struggle with extreme ambient illumination and complex scenes, prohibiting reliable depth estimates in uncontrolled in-the-wild scenarios.

These limitations are direct consequences of the pipeline design of existing active stereo systems, which hand-engineer the illumination patterns and the reconstruction algorithms in isolation. Typically, the illumination pattern is designed in a first step using a diffractive optical element (DOE) placed in front of a laser diode. Existing dot patterns resulting from known diffractive gratings, such as the Dammann grating (10), are employed with the assumption that generating uniform textures ensures robust disparity estimation for the average scene. Given a fixed illumination pattern, the reconstruction algorithm is then designed with the goal of estimating correspondence using cost-volume methods (7, 22) or learning-based methods (39, 12, 55, 38).

Depth imaging, design of illumination patterns, depth construction based on active depth estimation and optimization of illumination based on differentiable optics are critical techniques. Below is an overview of these related techniques.

Depth Imaging

Depth cameras can be broadly categorized into two families, passive and active cameras. Passive methods exploit depth cues such as parallax (40, 13), defocus (28), and double refraction (6, 33) that do not require illumination control. Passive methods often fail on challenging scene parts, such as textureless surfaces, where they can produce catastrophic depth estimation errors. Active systems employ specialized illumination modules to tackle textureless surfaces. Major directions include pulsed and continuous-wave time-of-flight sensors (20, 19), gated imaging (15), structured-light sensor (16, 52), and active stereo systems (55). Among these, active stereo is particularly attractive as it promises robust single-shot depth imaging at low system cost and small form factor. As such, active stereo systems have successfully been deployed in mass-market (1, 2). However, existing active-stereo systems also struggle in challenging environments with strong ambient light and noisy inputs with varying scene reflectance. This reduced accuracy partly originates from the blind, compartmentalized design process of the illumination pattern, which often does not consider the reconstruction method, scene statistics, and illumination conditions. There is a need to close the gap by proposing to jointly optimize the illumination patterns and the reconstruction method for active stereo.

Illumination Patterns for Active Stereo

Designing an illumination pattern is crucial for the accuracy of correspondence matching in active stereo systems. Existing methods commonly employ Dammann gratings (10) and Vertical Cavity Surface Emitting Lasers that result in locally-distinct, but globally repetitive illumination patterns (30, 26, 1). This heuristic design is blind to scene statistics, noise levels, and the reconstruction method. Existing methods have attempted to improve depth estimation by employing alternative hand-crafted DOE designs (11, 49, 34) that rely on alternative experts and heuristic metrics on the illumination patterns. There is a need to depart from these heuristic designs and instead directly optimize the illumination pattern with the depth reconstruction accuracy as a loss via end-to-end optimization.

Active Stereo Depth Estimation

Depth reconstruction for active-stereo systems aims to estimate accurate correspondence between stereo images with the aid of projected illumination patterns for feature matching. The corresponding large body of work can be categorized into methods relying on classic patch-based correspondence matching (22, 7) and recent learning-based methods (39, 12, 55, 38). Zhang et al. (55) proposed an active stereo network with self-supervision, removing the cumbersome process of acquiring training data, and improving depth estimation accuracy. All of these existing reconstruction methods are limited by the fixed illumination pattern. As such, these methods have to adapt to a given pattern and cannot vary the pattern to suit different imaging conditions. There is a need to jointly optimize the illumination and reconstruction module, allowing to tailor the pattern to the reconstruction method and scene statistics. Moreover, a need exists for departing from existing approaches, utilizing trinocular reconstruction to exploit knowing illumination pattern itself.

Differentiable Optics

With the advent of auto-differentiation frameworks (3, 37), jointly optimizing imaging optics and reconstruction methods have shaped the design process of diverse vision systems (8, 50, 35, 47, 17, 53, 9, 43, 32, 46). While existing methods have focused on the imaging optics and primarily assume near-field propagation, disclosed embodiments instead optimize illumination optics, specifically a DOE in front of a collimated laser, using far-field wave propagation from a laser to the scene. At the same time, disclosed embodiments rely on ray optics to simulate stereo imaging via epipolar geometry. This hybrid image formation, which exploits both wave and geometric optics, allows us to efficiently simulate light transport in active stereo systems while being efficient enough for gradient-based end-to-end optimization. Disclosed embodiments note that Wu et al. (54) proposed a depth-from-defocus method with a learned aperture mask for structured-light systems. However, this blur-based structured-light projection suffers from frequency-limited features. A need exists to optimize a diffraction pattern at the far field for active stereo.

Thus, an improved method that can solve the above-mentioned problems is needed.

SUMMARY

According to first broad aspect, the present disclosure provides a method for generating optimal structured illumination patterns for 3D imaging, comprising: modeling a projected illumination pattern; simulating stereo images; reconstructing a 3D scene, wherein the modeling of illumination pattern and reconstruction are joint in an end-to-end fashion.

According to a second broad aspect, the present disclosure provides a system for generating optimal structured illumination patterns for 3D imaging, comprising: a differentiable image formation model; and a trinocular reconstruction network, wherein the differentiable image formation model and the trinocular reconstruction network function jointly in an end-to-end fashion.

BRIEF DESCRIPTION OF THE DRAWINGS

The patent or application file contains at least one drawing executed in color. Copies of this patent or patent application publication with color drawing(s) will be provided by the office upon request and payment of the necessary fee.

The accompanying drawings, which are incorporated herein and constitute part of this specification, illustrate exemplary embodiments of the invention, and, together with the general description given above and the detailed description given below, serve to explain the features of the invention.

DETAILED DESCRIPTION OF THE INVENTION

Definitions

Figure 1:
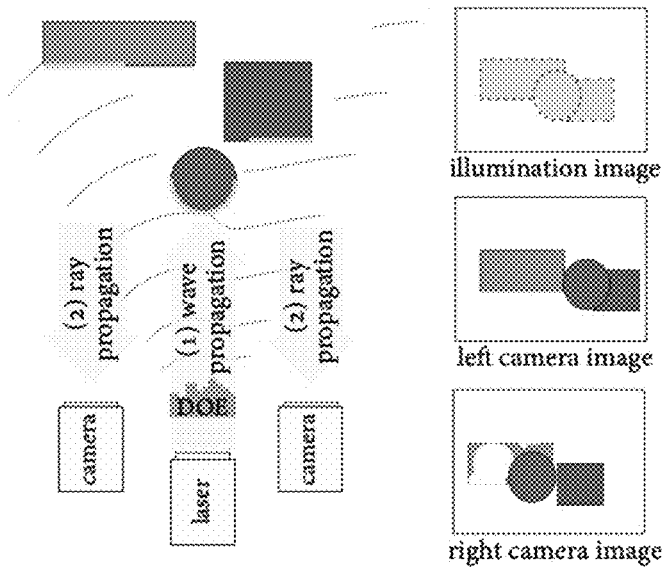
FIG. 1 is a schematic illustration showing a simulation of the illumination image projected by the laser and the DOE using wave optics and a simulation of the stereo images captured by cameras using geometric optics according to an embodiment of the present disclosure.

Where the definition of terms departs from the commonly used meaning of the term, applicant intends to utilize the definitions provided below, unless specifically indicated.

It is to be understood that the foregoing general description and the following detailed description are exemplary and explanatory only and are not restrictive of any subject matter claimed. In this application, the use of the singular includes the plural unless specifically stated otherwise. It must be noted that, as used in the specification and the appended claims, the singular forms "a," "an" and "the" include plural referents unless the context clearly dictates otherwise. In this application, the use of "or" means "and/or" unless stated otherwise. Furthermore, use of the term "including" as well as other forms, such as "include", "includes," and "included," is not limiting.

For purposes of the present disclosure, the term "comprising", the term "having", the term "including," and variations of these words are intended to be open-ended and mean that there may be additional elements other than the listed elements.

For purposes of the present disclosure, directional terms such as "top," "bottom," "upper," "lower," "above," "below," "left," "right," "horizontal," "vertical," "up," "down," etc., are used merely for convenience in describing the various embodiments of the present disclosure. The embodiments of the present disclosure may be oriented in various ways. For example, the diagrams, apparatuses, etc., shown in the drawing figures may be flipped over, rotated by 90° in any direction, reversed, etc.

For purposes of the present disclosure, a value or property is "based" on a particular value, property, the satisfaction of a condition, or other factor, if that value is derived by performing a mathematical calculation or logical decision using that value, property or other factor.

For purposes of the present disclosure, it should be noted that to provide a more concise description, some of the quantitative expressions given herein are not qualified with the term "about." It is understood that whether the term "about" is used explicitly or not, every quantity given herein is meant to refer to the actual given value, and it is also meant to refer to the approximation to such given value that would reasonably be inferred based on the ordinary skill in the art, including approximations due to the experimental and/or measurement conditions for such given value.

For purposes of the present disclosure, the term "geometric optics" refers to the treatment of the passage of light through lenses, prisms, etc. by representing the light as rays.

For purposes of the present disclosure, the term "wave optics" refers to studies and methods dealing with wave characteristics of light, including various phenomena such as polarization, diffraction, interference and other occurrences where ray approximation of geometric optics cannot be done.

For purposes of the present disclosure, the term "network" refers to the transmission and processing of signals of light, rag, illumination, disparity, etc.

For purposes of the present disclosure, the terms "trinocular stereo network" and "trinocular reconstruction network" are used interchangeably. They refer to a system that uses at least three inputs to reconstruct a 3D scene. Among the three inputs, at least one is the known illumination pattern and at least one is stereo input.

Description

While the invention is susceptible to various modifications and alternative forms, specific embodiment thereof has been shown by way of example in the drawings and will be described in detail below. It should be understood, however, that it is not intended to limit the invention to the particular forms disclosed, but on the contrary, the invention is to cover all modifications, equivalents, and alternatives falling within the spirit and the scope of the invention.

In one embodiment, the present disclosure provides a method that jointly learns illumination patterns and a reconstruction algorithm, parameterized by a DOE and a neural network, in an end-to-end manner. The method uses a differentiable image formation model, and reconstructs images using a trinocular active stereo network, which can then conduct a self-supervised finetuning. By also considering the reconstruction algorithm, the method in the present disclosure obtains more accurate illumination patterns, even with the presence of strong ambient light and noisy inputs. The resulting optimal illumination patterns ("Polka Lines"), together with the reconstruction network, allow for high-quality scene reconstructions.

In one embodiment, the method in the present disclosure, for the first time, allows learning of environment-specific illumination patterns for active stereo systems. The proposed method of learning structured illumination hinges on a differentiable image formation model that relies on wave and geometric optics to make the illumination and capture simulation accurate and, at the same time, efficient enough for joint optimization.

In one embodiment, a trinocular active stereo network in the present disclosure, which uses the known illumination pattern in addition to the stereo inputs, estimates an accurate depth map from the sensor inputs. Unlike previous methods that only use binocular inputs from the stereo cameras, the network in the present disclosure exploits the known illumination pattern, resulting in a trinocular stereo setup that reduces reconstruction errors near occlusion boundaries.

In one embodiment, by training the fully differentiable illumination and reconstruction model in a supervised manner and fine-tuning the reconstruction for an experimental prototype in a self-supervised manner, the proposed Polka Lines patterns, together with the reconstruction network, allow the achieving of state-of-the-art active stereo depth estimates for a wide variety of imaging conditions. The method in the present disclosure jointly learns optimal "Polka Lines" illumination patterns via differentiable end-to-end optimization, which can be specialized to specific illumination conditions.

Differentiable Hybrid Image Formation

To jointly learn structured illumination patterns and reconstruction methods, the present disclosure introduces a differentiable image formation model for active stereo sensing. Active stereo systems consist of stereo cameras and an illumination module that codes light with a laser-illuminated DOE as shown in FIG. 1. The light transport of an active stereo system can be divided into two parts: one describing the propagation of the laser light into the scene with the output of the illumination pattern cast onto the scene, and the other describing the illumination returned from the scene to the stereo cameras. The illumination image obtained through wave propagation relies on wave optics and the camera images obtained through ray propagation rely on geometric optics, comprising the proposed hybrid image formation model.

The first step of hybrid image formation is modeling the projected illumination pattern. Simulating light transport from an active stereo illumination module to a scene amounts to computing the illumination pattern projected onto the scene from the laser. Relying on wave optics, the light emitted by the laser is represented as amplitude A and phase φ at each discrete spatial location x, y sampled with pitch u (u=1 μm) and with N×N resolution. In one embodiment, N=1000.

The phase of the emitted light wave is modulated when it passes through the DOE by $\Phi_{delay}$ as $\Phi \leftarrow \Phi + \Phi_{delay}$. The phase delay $\Phi_{delay}$ is related to the height of the DOE h, the wavelength of the light λ, and the refractive index of the DOE for that wavelength $\eta_\lambda$, that is $$\phi_{delay} = \frac{2\pi(\eta_\lambda - 1)}{\lambda} h. \tag{1}$$

Next, the light wave modulated by the DOE propagates into the scene. This propagation was modeled using Fraunhofer far-field wave propagation because it was assumed that scene depth ranges from 0.4 m to 3 m which is sufficiently larger than the wave spatial extent uN=1 mm (14). This propagation operation was implemented by computing the Fourier transform F of the complex-valued light wave U of amplitude A and phase φ

$$U' \leftarrow F(U), \tag{2}$$

where U' is the propagated complex light wave. Finally, the illumination pattern P in the scene is the intensity of the propagated light wave, a squared magnitude of U'

$$P \leftarrow |U'|^2. \tag{3}$$

The resolution of the pattern P remains the same as that of U, while the physical pixel pitch v of the pattern P changes accordingly as v=λz/uN, where z is the propagation distance (14).

A pixel in the simulated illumination image P has the physical width of v=λz/uN at a scene depth z. At the same time, a camera pixel maps to a width of (p/f)*z at the scene depth z via perspective unprojection, where f is the camera focal length, and p is the pixel pitch of the camera. The illumination image P was resampled to have the same pixel pitch as a camera pixel pitch. The corresponding scale factor was computed as follows:

$$\frac{\text{camera pixel size}}{\text{illumination pattern pixel size}} = \frac{\frac{p}{f}z}{\frac{\lambda}{uN}z} = \frac{puN}{f\lambda} \tag{4}$$

The scale factor puN/fλ is applied to the illumination image P←resample (P, puN/fλ), where resample is the bicubic resampling operator.

Note that the depth dependency for the pixel sizes for the illumination pattern and the camera disappears in the scaling factor, meaning that the scale factor is independent of the propagation distance of the light. This indicates that the illumination pattern P can be applied to any scene regardless of its depth composition, which facilitates efficient simulation of the light transport.

Once the illumination image P is computed, stereo images were then simulated. While wave optics can describe this procedure using Wigner distribution functions and far-field wave propagation, this would be prohibitively expensive for the proposed end-to-end optimization procedure, which requires tens of thousands of iterations, each triggering multiple forward simulations. Thus, in one embodiment, a geometric-optics model representing light using intensity only was used in the present disclosure, instead of both phase and amplitude as in wave optics.

Given the illumination image P at the viewpoint of the illumination module, the light-matter interaction and sensor measurement are then simulated by the stereo cameras. In the model of light-matter interaction and measurement, disparity maps $D^{L/R}$, reflectance maps $I^{L/R}$, and occlusion masks $O^{L/R}$ at the left and the right camera viewpoints were used. Occlusion masks $O^{L/R}$ describe the visibility at the viewpoints of the left/right camera with respect to the illumination module.

Firstly, the illumination image P was warped to the left and the right camera viewpoints using the disparity $D^{L/R}$. The occlusion maps $O^{L/R}$ were incorporated through element-wise multiplication with the warped images, resulting in the final illumination images seen at the stereo camera viewpoints ($P^L$ and $P^R$), that is, $$P^{L/R} = O^{L/R} \odot \mathrm{warp}(P, D^{L/R}) \quad (5)$$

where $\odot$ is the element-wise product and the operator "warp" warps the illumination image P by the disparity $D^{L/R}$.

Scene response and sensor measurement were then computed using a Lambertian reflectance model. Imaging parameters including sensor clipping, signal-independent Gaussian noise, camera exposure, illumination power, and ambient illumination were implemented. Altogether, this is described by:

$$J^{L/R} = \sigma(\gamma(\alpha + \beta P^{L/R}) I^{L/R} + \eta) \quad (6)$$

where $J^{L/R}$ are the simulated captured images for the left and the right camera viewpoints. The term $\gamma$ is the scalar describing exposure and the sensor's spectral quantum efficiency, $\alpha$ is the ambient light, $\beta$ is the power of the laser illumination, $\eta$ is Gaussian noise, and $\sigma$ is the intensity-cropping function.

Trinocular Active Stereo Network

Figure 2:
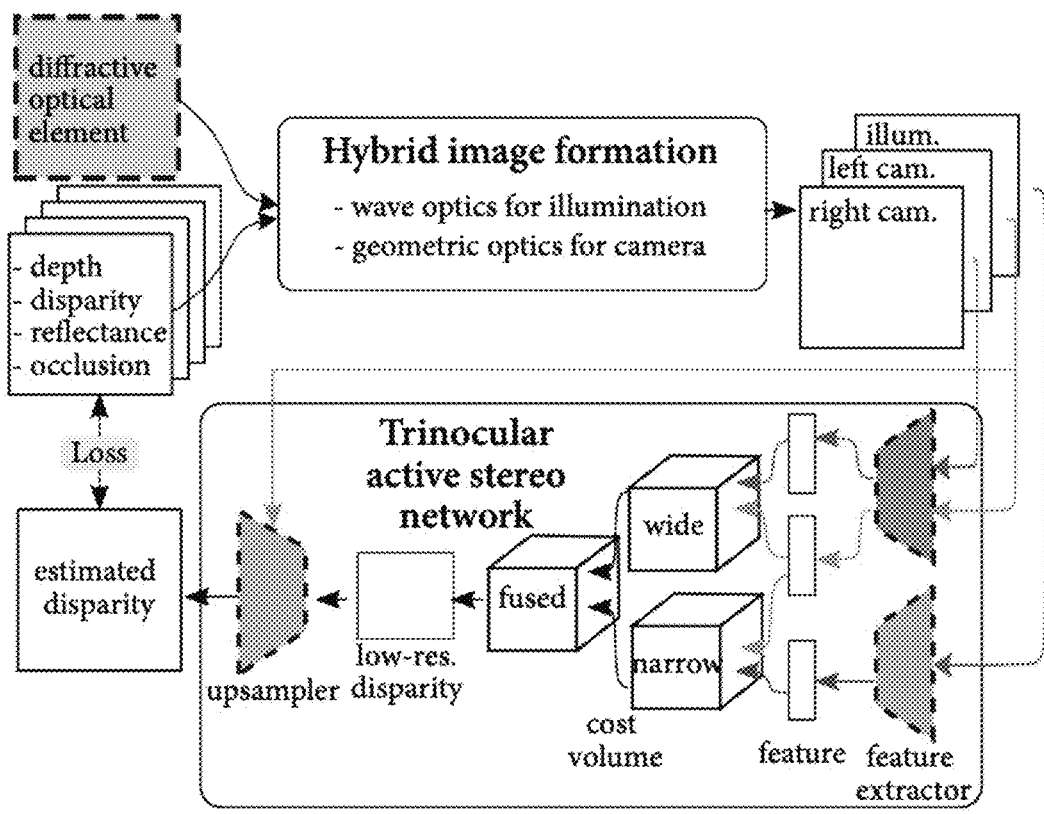
FIG. 2 is a diagram showing the proposed hybrid image formation model that simulates the stereo images from which disclosed embodiments reconstruct a depth map using a trinocular network according to an embodiment of the present disclosure.

The disclosed method departs from existing active stereo architectures that take stereo images or a single illumination image as inputs (55, 38), by exploiting the fact that an active stereo system provides stereo cues between the cameras but also the illumination and camera pairs. Specifically, two baseline configurations were considered in the active stereo camera in the present disclosure: a narrow-baseline configuration between the illumination module and either of the two cameras, and one wide-baseline pair consisting of the left and right cameras. To take advantage of these two different baselines, the following trinocular active stereo network is proposed and illustrated in FIG. 2. In FIG. 2, the loss is backpropagated to both the DOE and the network, enabling joint optimization while the dotted boxes indicate optimization parameters.

The proposed reconstruction network receives the following inputs: a left-camera image $x_L$, a right-camera image $x_R$, and an illumination image $x_{illum}$. During the training phase, the image formation model synthetically generates these trinocular inputs; during real-world testing, disclosed embodiments directly use the calibrated sensor inputs.

The proposed network first extracts feature tensors $y_{L/R/illum}$ of the three input images using two convolutional encoders: $FE_{cam}$ for the camera images and $FE_{illum}$ for the illumination image, that is $$y_L = FE_{cam}(x_L), y_R = FE_{cam}(x_R),$$

$$y_{illum} = FE_{illum}(x_{illum}). \quad (7)$$

Next, trinocular cost volumes were constructed for two separate baselines. A feature cost volume $C_{wide}$ for the wide-baseline pair is defined as $$C_{wide}^d(x,y) = y_L(x,y) - y_R(x-d,y), \quad (8)$$

where d is a disparity candidate. Similarly, the narrow-baseline cost volume is defined between the left-camera features $y_L$ and the illumination features $y_{illum}$ as $$C_{narrow}^d(x,y) = y_L(x,y) - y_{illum}(x-d,y), \quad (9)$$

Then, the two cost volumes were fused into a single cost volume:

$$C_{fused}^d = C_{wide}^d + C_{narrow}^{\hat{d}}, \quad (10)$$

where $\hat{d} = d_{b_{narrow}}^{b_{wide}}$ is the disparity scaled by the ratio between the wide baseline and the narrow baseline. Per-pixel disparity probability is computed using a soft-max layer, followed by disparity regression on the obtained probability resulting from the low-resolution disparity estimate (55). Finally, an edge-aware convolutional upsampler estimates a disparity map $D_{est}^L$ for the left camera viewpoint at the original resolution.

Denoting the network parameters as $\theta$ and the phase delay for the DOE as $\varphi_{delay}$, joint learning was achieved by solving the following end-to-end joint optimization problem:

$$\underset{\varphi_{delay},\theta}{\mathrm{minimize}}\; \mathcal{L}_s\!\left(D_{est}^L(\varphi_{delay}, \theta), D^L\right), \quad (11)$$

where $L_s$=MAE is the mean-absolute-error loss of the estimated disparity supervised by the ground-truth disparity $D^L$. Solving this optimization problem using stochastic gradient methods is only made possible by formulating the proposed image formation model and reconstruction method as fully differentiable operations. Varying ambient illumination conditions were also incorporated into the presently disclosed learning framework by controlling the following simulation parameters: ambient light power $\alpha$ and scalar $\gamma$ in Equation (6). Three separate models for different illumination configurations of generic, indoor, and outdoor environments were trained.

To train the models, the presently disclosed method requires an active-stereo dataset of disparity maps $D^{L/R}$, NIR reflectance maps $I^{L/R}$, and occlusion masks $O^{L/R}$ at the left and the right camera viewpoints. To obtain this dataset, a synthetic passive-stereo RGB dataset (31) was modified, which provides disparity maps $D^{L/R}$ but not the NIR reflectance maps $I^{L/R}$ and the occlusion masks $O^{L/R}$. The NIR reflectance maps $I^{L/R}$ from the RGB stereo images were obtained using the RGB-inversion method (15). Next, the occlusion masks $O^{L/R}$ of the stereo cameras are computed with respect to the illumination module. the stereo occlusion masks were horizontally shrunk by half since the illumination module lies halfway between the stereo pair. Finally, the images were resized to the same resolution as the illumination images.

Figure 17:
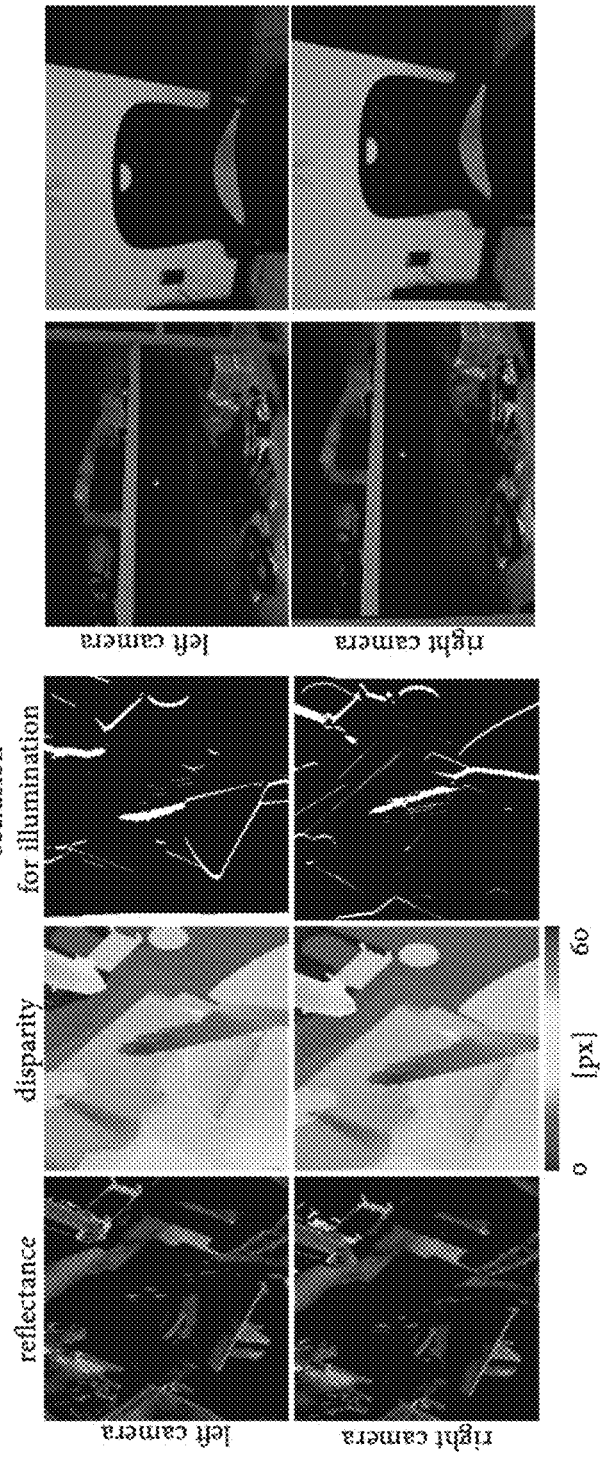
FIG. 17 is an image showing examples of the NIR-stereo datasets for synthetic training and finetuning according to an embodiment of the present disclosure.

The disclosed method uses two NIR-stereo datasets, one for training in simulation and the other for finetuning the experimental prototype. For the synthetic training, the RGB-stereo dataset (31) was modified, resulting in 21718 training images and 110 testing images. For finetuning, 76 real-world stereo images of indoor scenes were captured. FIG. 17 shows a sample from each dataset with varying reflectance and geometric complexity.

Self-Supervised Finetuning

To compensate for fabrication inaccuracies of the optimized DOE and the domain gap between the simulated training images and the real captures, the reconstruction network was finetuned using a real-world dataset captured by our prototype. To this end, left and right IR image pairs $J^{L/R}$ were captured and the illumination images $P^{L/R}$ were obtained by projecting patterns onto a diffuse textureless wall. However, for the disparity maps and the occlusion masks, it is challenging to obtain corresponding ground truths in the real world. Therefore, the self-supervised learning approach previously proposed (57, 55) was adopted.

The key idea in the self-supervised training step is to find disparity maps $D_{est}^{L/R}$ and validity maps $V_{est}^{L/R}$ that provide the optimal reconstruction of the stereo images $J^{L/R}$ by warping the other images $J^{L/R}$ with the disparity $D_{est}^{L/R}$ in consideration of the validity $V_{est}^{L/R}$. The validity maps are defined as the opposite of the occlusion maps $V_{est}^{L/R} = 1 - O_{est}^{L/R}$. In addition to the reconstruction network described above, a validation network that estimates the validation maps is also provided in the present disclosure. $V_{est}^{L/R}$ to account for occlusion. For the loss functions, $L_u$ encourages the network to estimate disparity maps that reconstruct one stereo view from the other view through disparity warping. $L_v$ is the regularization loss for the validity masks $V_e^{L/R}$ (55, 38). $L_d$ is the disparity smoothness loss. The network parameters of the trinocular reconstruction network and the validation network were trained on the captured stereo images and the illumination image of the prototype. At the inference time, the disparity estimates of pixels with low validity were masked out.

Figure 19:
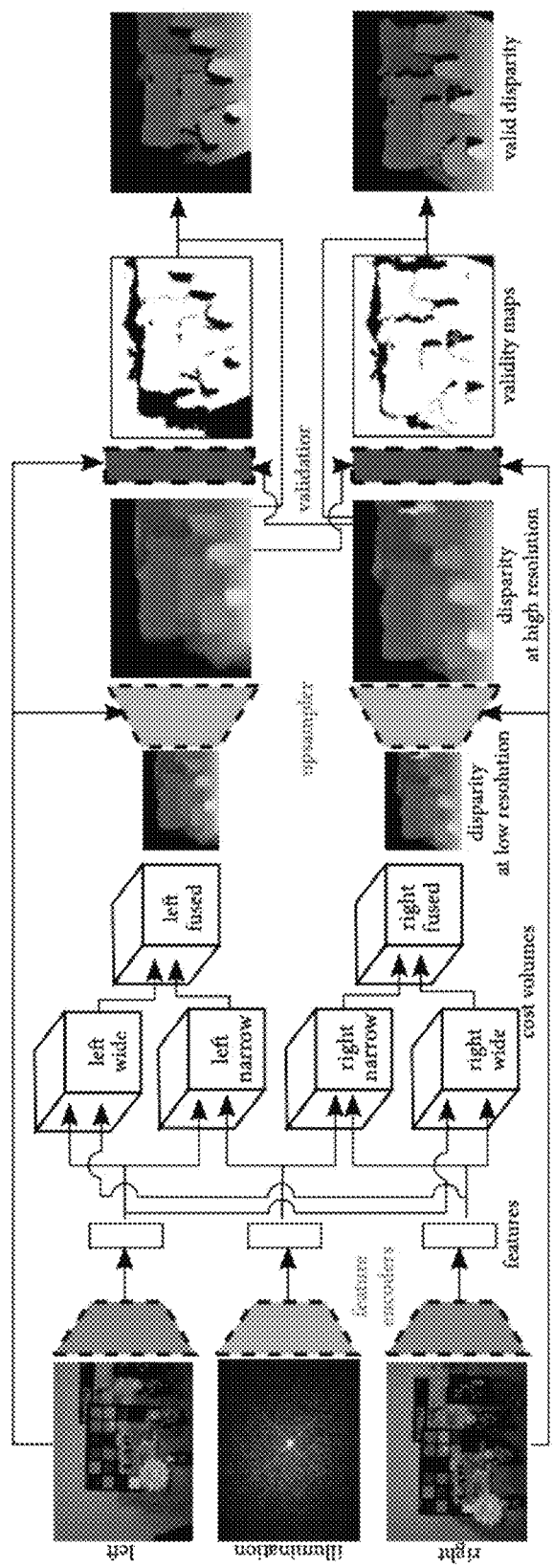
FIG. 19 is an image showing the network architecture according to an embodiment of the present disclosure.

To handle the domain gap between the simulation and the real-world inputs, self-supervised finetuning for the reconstruction network was applied. FIG. 19 shows the overview of the trinocular reconstruction network for finetuning. There are two major differences in the network used in the simulation. First, disparity maps for both left and right views were estimated. This is implemented by computing the right view disparity in the same way as computing the left view disparity, which is described in the main paper. Second, a validation network that estimates validity maps of the estimated disparity was introduced. The estimated left/right disparity maps to the other view were warped. In addition, the difference with the original disparity maps was computed. This difference and the stereo images are fed to the validation network as inputs. In summary, the changes in the network architecture and the loss function enabled effective handling of challenging regions such as large occlusion and strong specularity, which are often observed in real-world inputs. The finetuning is specifically formulated as the following optimization problem, $$\underset{\theta,\vartheta}{\text{minimize}} \; \mathcal{L}_u + \tau \mathcal{L}_v + \kappa \mathcal{L}_d, \qquad (14)$$

$$\mathcal{L}_u = MSE(J^{L/R} \odot V_{est}^{L/R}(\vartheta), J_{est}^{L/R}(\theta) \odot V_{est}^{L/R}(\vartheta)),$$

$$\mathcal{L}_v = CE(V_{est}^{L/R}(\vartheta), 1),$$

$$\mathcal{L}_d = MSE(\nabla D_{est}^{L/R}(\theta)),$$

where $V_{est}^{L/R}$ are the estimated left/right validity maps and $D_{est}^{L/R}$ are the corresponding disparity maps. $L_u$ computes the mean squared error between the input and the estimated sensor images via validity-weighted warping: $J_{est}^{L/R} = \text{warp}(J^{L/R}, D_{est}^{L/R})$. $L_v$ is the cross-entropy loss on the validity maps to avoid the trivial solution of making the validity as zero. $L_d$ is the disparity smoothness loss to cope with real-world challenges in correspondence matching. $\tau$ and $\kappa$ are the balancing weights set as 0.01 and 0.0001. The parameters of the reconstruction network $\theta$ are finetuned, while the validation network parameters $\vartheta$ is trained from scratch. Over 5 epochs were trained during finetuning. For visualizations, a validity map was used as a threshold to handle large occlusion.

Network architectures are provided in the table below including feature extractor, cost-volume filter, convolutional upsampler, and validation network for finetuning. In the table below, conv/res-k(x)-s(y)-d(z)-p(q) describes a convolution or residual layer with a kernel of x×x window, stride y, dilation rate z, and padding q.

| Name | Type | Channels |
|---|---|---|
| Feature Extractor | | |
| input | camera or illumination image | 1 |
| down | 3 × (conv-k5-s2-d2-p2) | 32 |
| res | 6 × (res-k3-s1-d1-p1-BN-LRelu) | 32 |
| conv | conv-k3-s1-d1-p1 | 32 |
| output | feature | 32 |
| Cost-Volume Filter | | |
| input | 3D cost volume | 32 |
| conv3 | 4 × (conv3-k3-s1-d1-p1-BN-LRelu) | 32 |
| conv3 | conv3-k3-s1-d1-p1 | 1 |
| output | filtered 3D cost volume | 1 |
| Convolutional Upsampler | | |
| input | high-res. image and bilinear-upsampled disparity | 32 |
| conv | conv-k3-s1-d1-p1-BN-LRelu | 32 |
| res1 | conv-k3-s1-d1-p1-BN-LRelu | 32 |
| res2 | conv-k3-s1-d2-p1-BN-LRelu | 32 |
| res3 | conv-k3-s1-d4-p1-BN-LRelu | 32 |
| res4 | conv-k3-s1-d8-p1-BN-LRelu | 32 |
| res5 | conv-k3-s1-d1-p1-BN-LRelu | 32 |
| res6 | conv-k3-s1-d1-p1-BN-LRelu | 32 |
| conv | conv-k3-s1-d1-p1-Relu | 1 |
| output | high res. disparity | 1 |
| Validation Network for Finetuning | | |
| input | image and warped image from the other view | 2 |
| conv | conv-k3-s1-d1-p1-BN | 32 |
| res | 5 × (res-k3-s1-d1-p1-BN-LRelu) | 32 |
| conv | conv3-k3-s1-d1-p1-Sigmoid | 1 |
| output | invalid mask from zero to one | 1 |

Evaluation of End-to-End Framework

The proposed end-to-end framework was evaluated using synthetic data.

Figure 3:
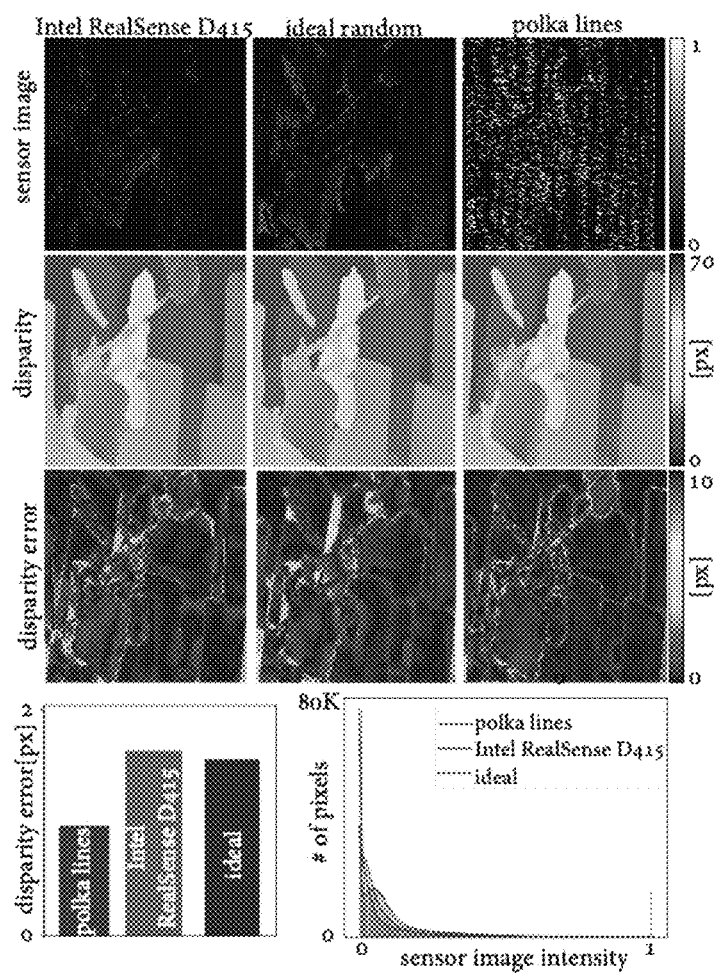
FIG. 3 is an image showing an evaluation of the learned illumination pattern in an indoor simulation and a comparison to the hand-crafted illumination pattern (Intel RealSense D415) and the ideal random pattern according to an embodiment of the present disclosure.

The effectiveness of the presently disclosed learned illumination, the Polka Lines pattern, was evaluated by comparing to heuristically-designed patterns: the pseudo-random dot and the regularly spaced dot (1). For a fair comparison, the trinocular network architecture for all patterns and finetune the reconstruction network for each individual illumination pattern were used, with the results of the indoor test shown in FIG. 3. The experiments in FIG. 3 validate that the proposed Polka Lines pattern out-performs the conventional patterns in indoor environments. For these synthetic experiments, equal illumination power was used for all illumination patterns. The proposed Polka Lines design is the result of the proposed optimization method. The performance of this pattern was interpreted by analyzing the structure of the Polka Lines patterns compared to heuristic patterns. First, each dot in a line of dots has varying intensity levels, in contrast to the constant-intensity heuristic patterns. The improved performance in large dynamic ranges may be attributed to these varying dot intensities. Second, the orientations of Polka Lines are locally varying, which is a discriminative feature for correspondence matching.

Figure 4:
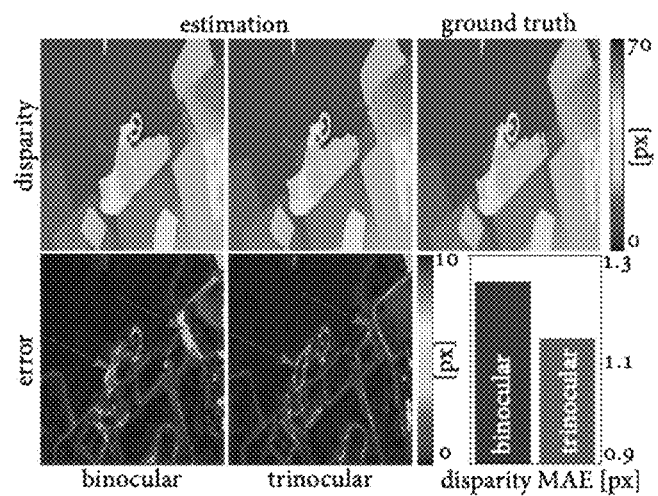
FIG. 4 is an image showing that the proposed trinocular reconstruction approach is more robust at object boundaries than conventional binocular methods, as it exploits cues between several cameras and illumination pairs in a single active stereo system according to an embodiment of the present disclosure.

In addition, the trinocular reconstruction method was also validated by comparing it to binocular methods such as Zhang et al. (56). A baseline model that ingests only binocular inputs of stereo camera images was built by removing the illumination feature extractor. FIG. 4 shows that the binocular reconstruction method struggles, especially in occluded regions, where the proposed trinocular approach provides stable estimates.

Figure 24:
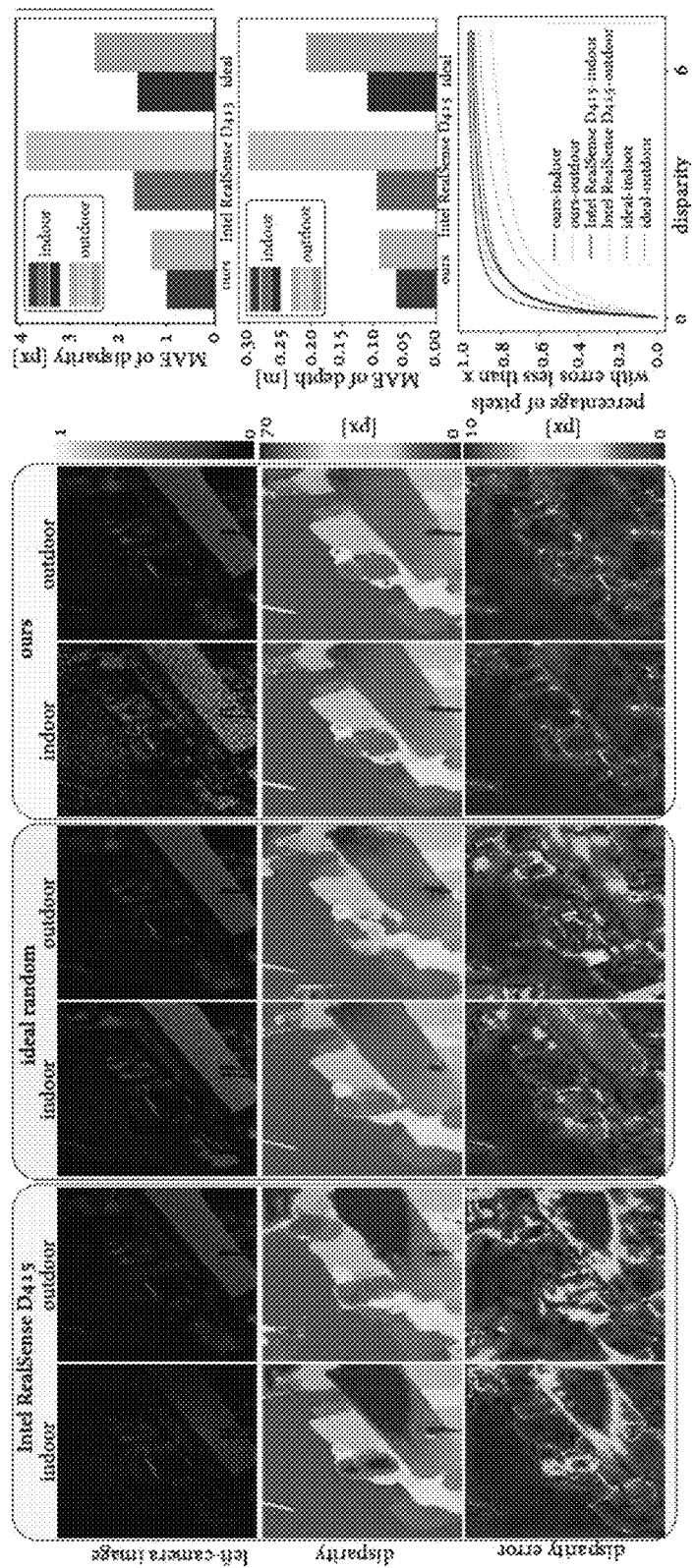
FIG. 24 is an image showing the comparison of Intel RealSense D415 pattern, ideal random pattern, and the learned Polka Lines pattern in the simulation according to an embodiment of the present disclosure.

Disclosed embodiments compare our learned Polka Lines pattern to the Intel RealSense D415 pattern and the ideal random-dots pattern in simulation. FIG. 24 shows that the Intel RealSense D415 pattern contains sparse and low highest intensity feature points with repeated structure, leading to reconstruction artifacts. It is worth noting that there is a disparity bias in the estimates of the Intel RealSense D415 pattern. The bias is at around 10 px which corresponds to the distance between the two nearest dot features. Based on this observation, disclosed embodiments speculate that this failure may come from the characteristics of the two-scale Intel RealSense D415 features. That is, it has high-frequency 10 px-width dot features and also low-frequency 60 px-width heptagon features consisting of multiple dots. This could cause ambiguity when using the high-frequency or the low-frequency patterns used for correspondence matching, resulting in the disparity bias. Specifically, disclosed embodiments observe that 10 px of disparity bias happens as the reconstruction network uses the high-frequency dots as matching features instead of the low-frequency components. Thus, this fundamental ambiguity in the Intel RealSense D415 pattern often leads to biased estimates. The ideal random-dot pattern provides high-quality depth reconstruction on average, however, reconstruction quality degrades under high ambient light conditions due to the scattered light energy by the random phase distribution. In contrast, our Polka Lines pattern provides accurate reconstructions with dense features and varying-intensity dots that disclosed embodiments learn from end-to-end optimization with the goal of accurate depth reconstruction.

Figure 25:
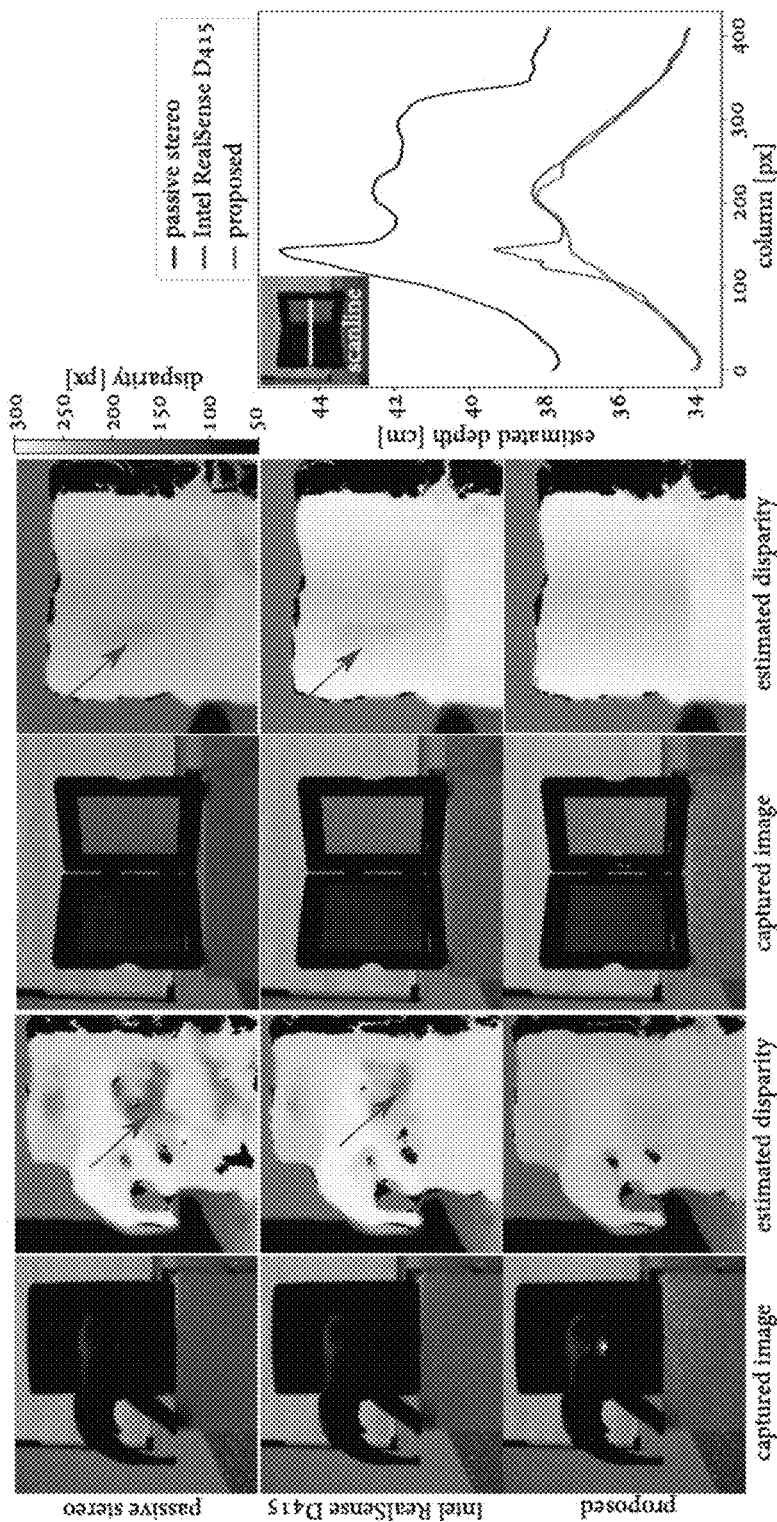
FIG. 25 is an image showing that the learned illumination pattern with varying-intensity dots outperforms passive stereo and the conventional fixed-intensity pattern (Intel RealSense D415 sensor) for a high dynamic range of incident light with blue arrows indicating estimation artifacts according to an embodiment of the present disclosure.

FIG. 25 shows the real-world comparison of the passive stereo, the Intel RealSense D415 pattern, and our Polka Lines pattern. Our Polka Lines design provides accurate reconstruction on feature-less objects. For additional analysis of the illumination intensity, refer to FIG. 18 validating that our pattern provides higher peak power while maintaining average power.

In one embodiment, the end-to-end learning method readily facilitates the design of illumination patterns tailored to specific environments by changing the environment parameters in Equation (6) and solving Equation (11). In one embodiment, the environment-specific illumination design by varying the ambient power $\alpha$ and the laser power $\beta$ to simulate indoor, outdoor, and hybrid "generic" environments. In one embodiment, the parameter values variants depending on the environments include: indoor ($\alpha=0.0$, $\beta=1.5$), outdoor ($\alpha=0.5$, $\beta=0.2$), generic ($\alpha\in[0, 0.5]$, $\beta\in[0.2, 1.5]$).

Figure 5:
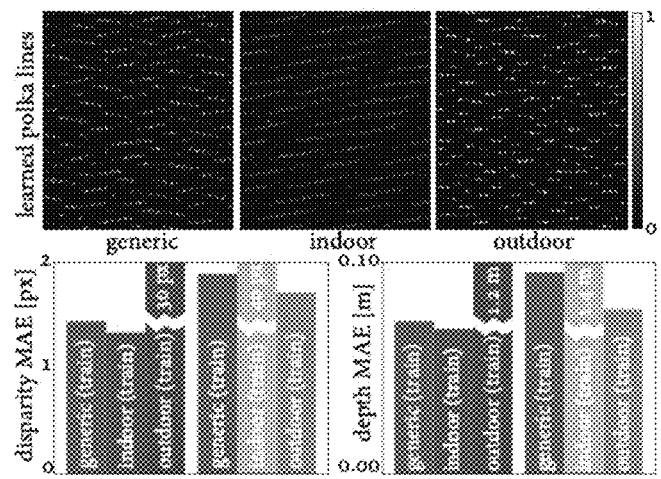
FIG. 5 is an image showing that the proposed end-to-end optimization method can learn illumination patterns tailored to indoor, outdoor, and generic environments, by changing simulation parameters according to an embodiment of the present disclosure.

FIG. 5 demonstrates that the illumination pattern becomes dense with low-intensity dots in the indoor case for dense correspondence, whereas the outdoor environment promotes a sparse pattern with high-intensity dots that stand out from the ambient light. In the generic environment, "Polka Lines" was obtained with varying intensities from low to high. The proposed method was also evaluated for two different noise levels, e.g., under strong ambient illumination, using the standard deviation values of 0.02 and 0.6 for the Gaussian noise term $\eta$.

Figure 6:
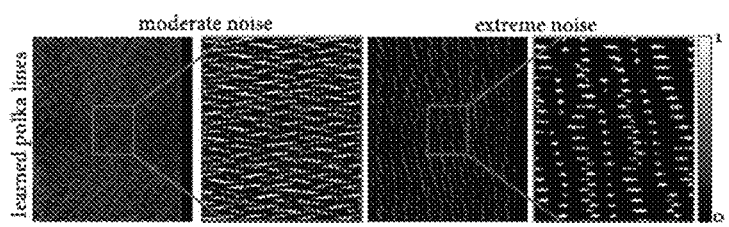
FIG. 6 is an image showing optimized illumination for different noise levels according to an embodiment of the present disclosure.

FIG. 6 shows that the illumination pattern becomes sparse with high-intensity dotted lines for the severe noise. As shown in FIG. 6, for scenarios with strong ambient light, leading to low illumination contrast, the illumination pattern is optimized to have higher-intensity sparse dots than the moderate noise environment.

The presently disclosed method facilitates incorporating system and environmental parameters in the image formation model, allowing the design of an illumination pattern tailored to the given scene. Specifically, the learned patterns were evaluated in terms of ambient light and noise level.

Figure 22:
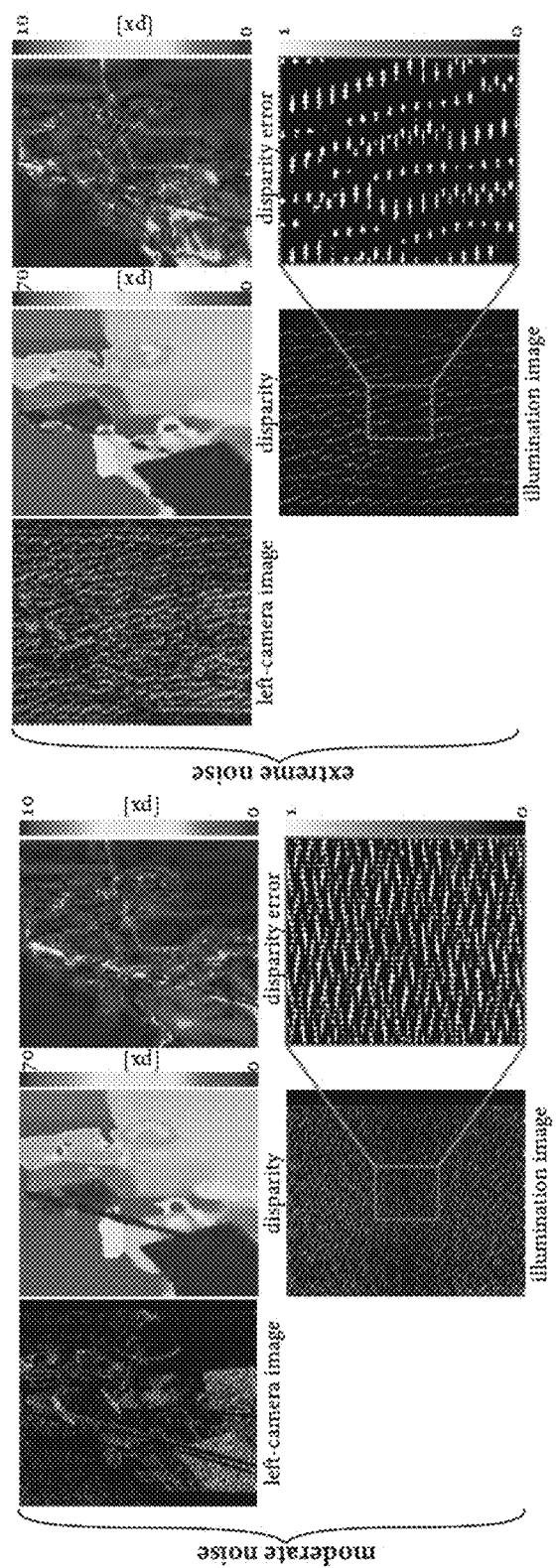
FIG. 22 is an image showing optimized illumination and depth reconstruction for different noise levels according to an embodiment of the present disclosure.

Measurement noise is critical for robust depth estimation and becomes strong in challenging environments, e.g., low-reflectance scene objects, strong ambient illumination, and long-range objects. FIG. 22 shows the optimized illumination images and corresponding depth reconstructions for the moderate and the extreme noise levels. The standard deviations of the Gaussian noise are 0.02 and 0.6 respectively. Extreme noise makes the illumination pattern sparse with high-intensity dots. In the moderate noise case, disclosed embodiments obtain dense varying-intensity Polka Lines in the illumination image, providing high-quality depth reconstruction.

Figure 23:
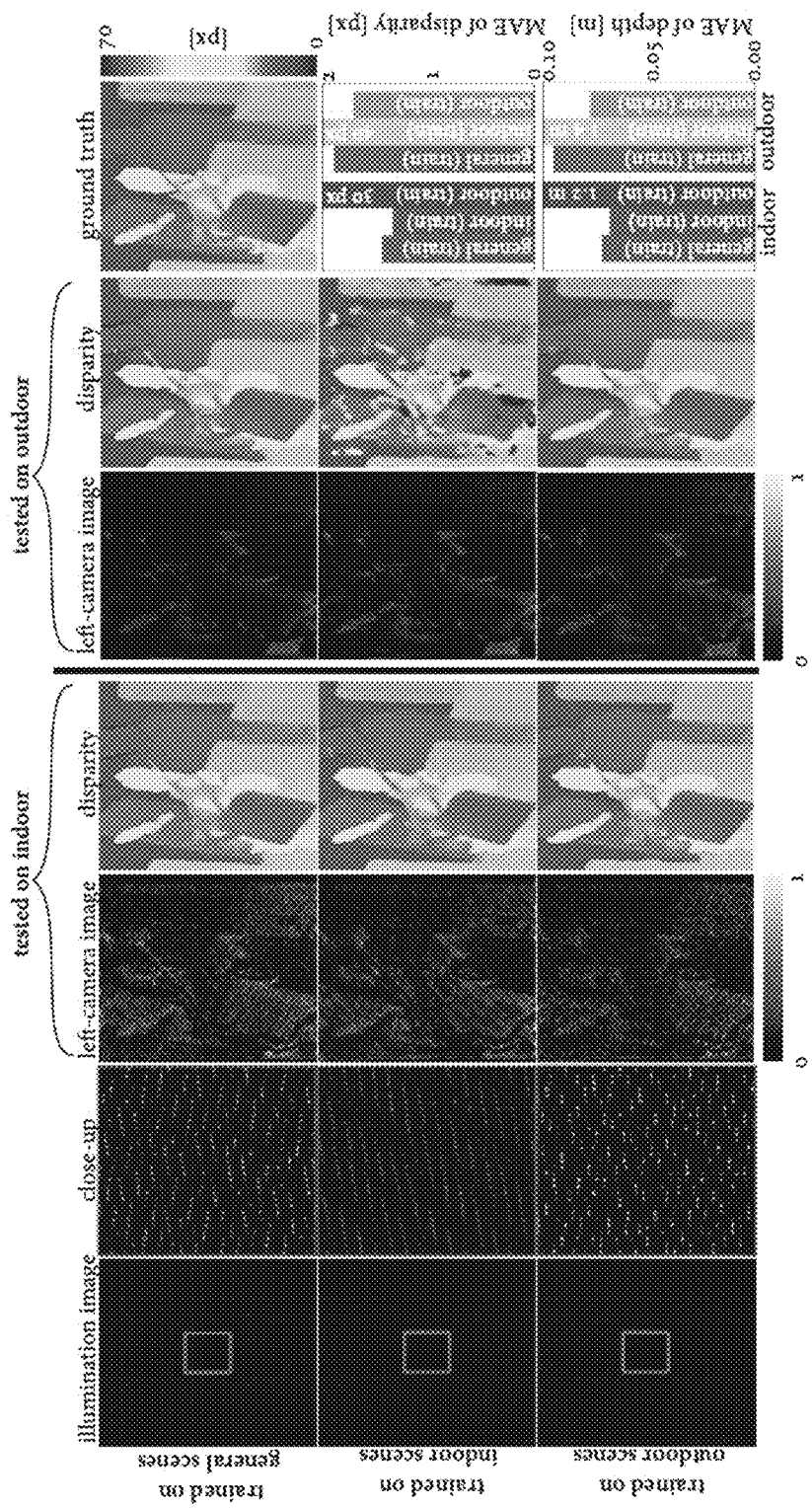
FIG. 23 is an image showing the design of illumination patterns tailored for indoor, outdoor, or general environments according to an embodiment of the present disclosure.

Disclosed embodiments also test varying ambient light power and laser power to simulate indoor and outdoor conditions by setting the parameter values of the ambient light power and the laser power as follows: indoor ($\alpha=0.0$, $\beta1.5$), outdoor ($\alpha=0.5$, $\beta=0.2$), and general ($\alpha\in[0, 0.5]$, $\beta\in[0.2, 1.5]$). Disclosed embodiments empirically chose the values of $\alpha$ and $\beta$ by capturing the relative intensity differences of laser illumination and ambient light indoors and outside. Disclosed embodiments train a DOE and a reconstruction network for each of the configurations. FIG. 23 shows the optimized illumination patterns and their performance tested in both indoor and outdoor environments. Disclosed embodiments learn dense Polka Lines in the indoor scenes to provide many features for correspondence matching. For the outdoor scenes, disclosed embodiments obtain sparse high-intensity Polka Lines, providing robustness against the strong ambient light and relatively weak laser power. When training on general environments, disclosed embodiments learn Polka Lines with varying intensities with moderate density.

Disclosed embodiments fabricated and placed these three DOEs for indoor, outdoor, and general conditions by mounting them on a manual rotation stage. In the future, disclosed embodiments envision using mechanically interchangeable DOE configurations or multiple projectors to adapt to the environment. The presently disclosed design may overcome the high manufacturing cost of multiple illumination modules and reduce their form factor.

The method in the present disclosure can also be repurposed to design a DOE that produces a target far-field illumination pattern when illuminated by a collimated beam. Designing DOEs for structured illumination has applications beyond active stereo, including anti-fraud protection, projection marking, and surface inspection (48).

Figure 7:
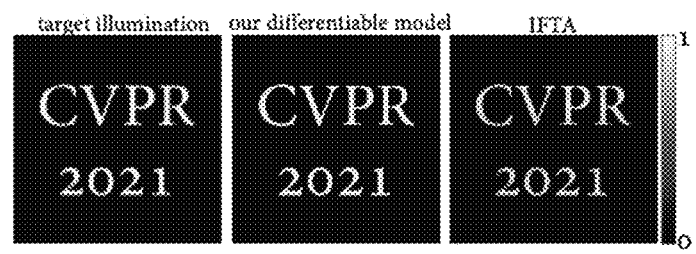
FIG. 7 is an image showing that the proposed differentiable image formation can be used for designing a DOE that produces the desired illumination pattern, by comparing to the state-of-the-art iterative FFT methods, while allowing for design flexibility according to an embodiment of the present disclosure.

FIG. 7 shows that reconstruction quality comparable to state-of-the-art iterative FFT methods (11) was obtained using the method in the present disclosure. The presently disclosed framework for DOE design offers greater flexibility. For example, any additional phase-changing optical element can readily be incorporated into the image formation model. Also, additional loss functions can be imposed, e.g., enforcing smoothness of the DOE to reduce potential fabrication inaccuracies.

Figure 16:
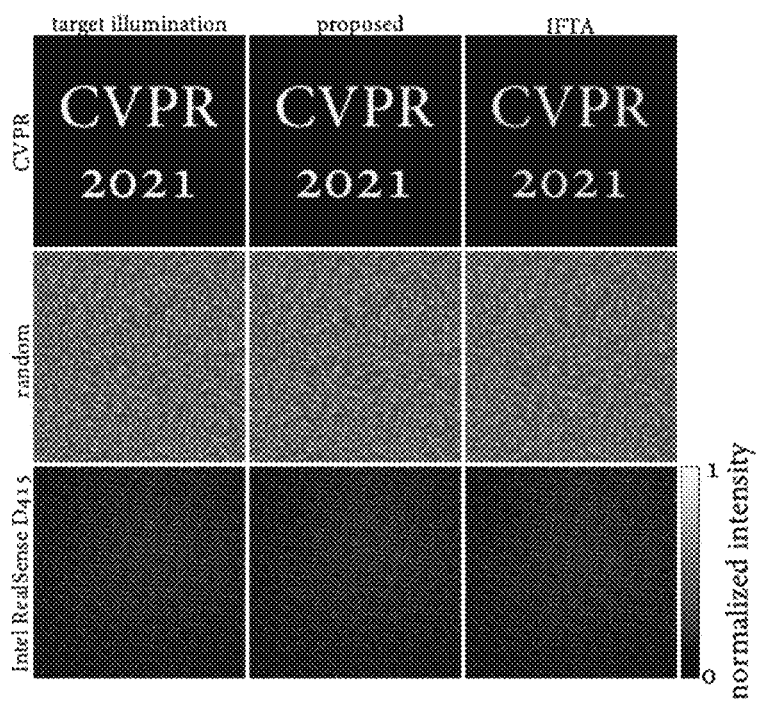
FIG. 16 is an image showing that the proposed differentiable image formation can be used for designing a DOE that produces the desired illumination pattern, by comparing to the state-of-the-art iterative FFT methods, while hand-crafted illumination pattern (Intel RealSense D415) and the ideal random pattern failed to achieve this function according to an embodiment of the present disclosure.

The production of specific target illumination patterns formulated as an optimization problem of minimizing the difference between the target pattern image $I_{target}$ and the simulated illumination image $I_{illum}$ for a given phase map of the DOE $\varphi$ as $$\underset{\phi}{\text{minimize }} MSE(I_{illum}(\phi), I_{target}), \qquad (12)$$

where MSE is the mean squared error. As computing the illumination image $I_{illum}(\varphi)$ consists of differentiable operations based on the image formation model, this problem was solved by relying on automatic differentiation using the Adam optimizer. FIG. 16 shows target images and reconstructions. The presently disclosed method was compared to the state-of-the-art iterative Fourier transform method (58) which indirectly solves the optimization problem. The presently disclosed method not only outperformed this baseline in terms of reconstruction accuracy but also provided design flexibility by changing the image formation model and the loss function on demand.

Figure 20:
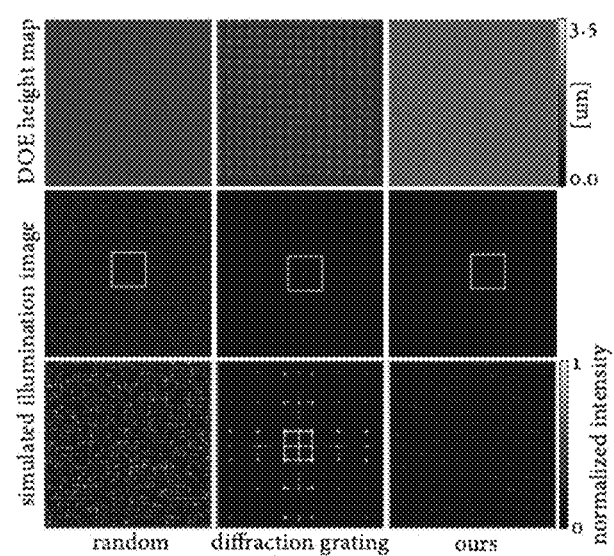
FIG. 20 is an image showing that the differentiable image formation can be applied to arbitrary DOE height maps, including random DOE height maps (left) and the 2D diffraction grating (middle), enabling the end-to-end design of illumination patterns for active-stereo systems according to an embodiment of the present disclosure.
Figure 21:
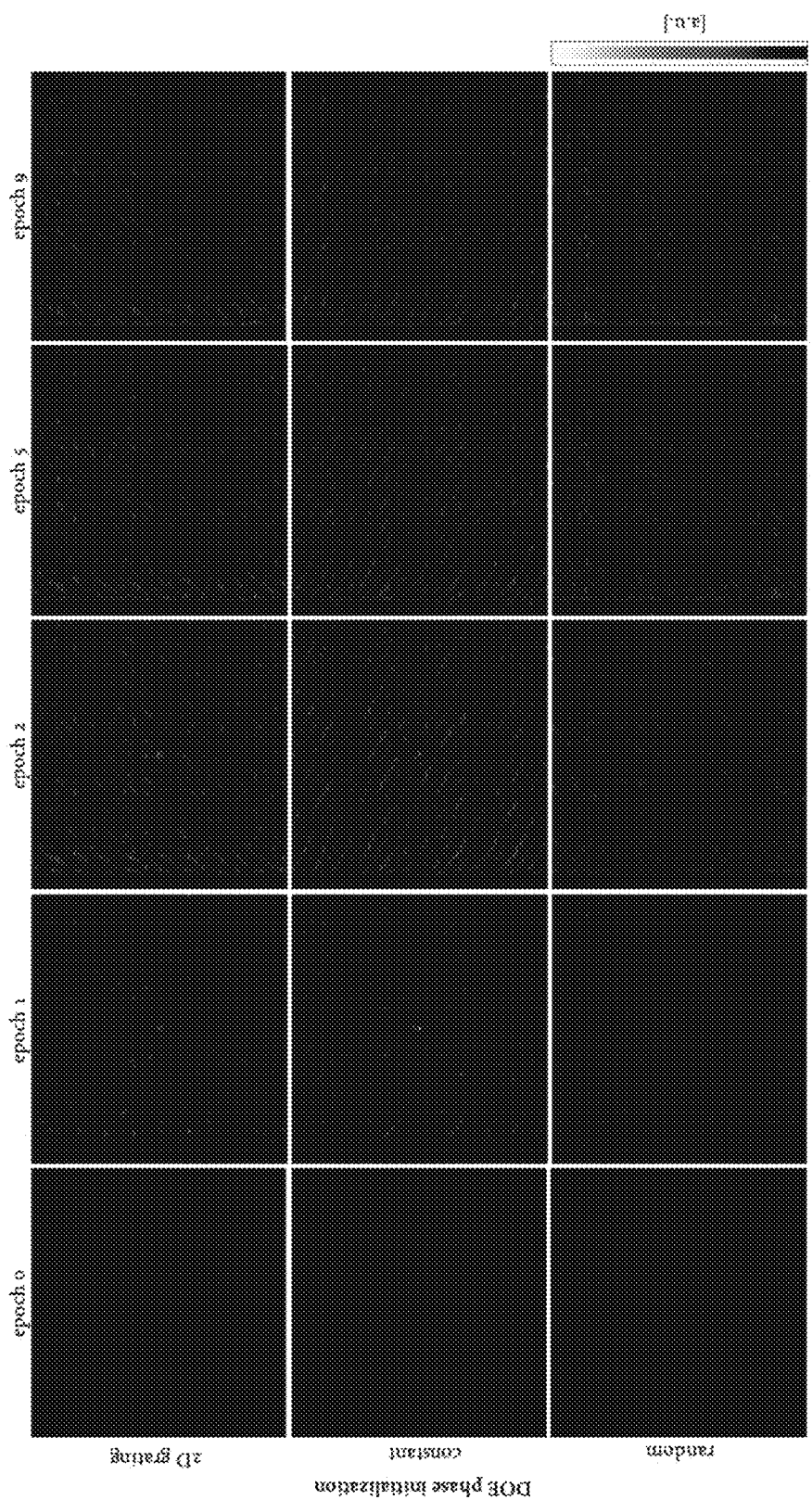
FIG. 21 is an image showing three different DOE initialization tested for the end-to-end training according to an embodiment of the present disclosure.

In the end-to-end training, DOE phase was initialized from a uniform random distribution from zero to $2\pi$. Two different DOE initializations, an all-zero phase initialization and a 2D diffraction grating phase initialization were also tested, as seen in FIG. 20. All initializations result in similar Polka Lines patterns as shown in FIG. 21. In FIG. 21, The learned illumination images converge to similar Polka Lines patterns after completing the training procedure.

Our image formation model for active stereo involves computing the illumination image for a given DOE profile. As a sanity check on our image formation model, disclosed embodiments compute the illumination patterns for two conventional DOE designs: random height DOE and 2D diffraction grating. In theory, their illumination patterns are random dots and regular grid patterns with decaying intensity profile as the diffraction order increases. FIG. 20 shows that our simulated illumination images contain these characteristics.

The learned Polka Lines illumination features high-density slanted dotted-line structures, each of which consists of small-size dots. This pattern has not been hand-engineered but was computationally found. These features are intuitively helpful for active stereo imaging and some of them can be found in existing illumination patterns such as the Heptagon projector pattern in the Intel RealSense D415. The presently disclosed end-to-end optimization method provides meaningful insights on how the trade-off between these properties should be maintained in the form of a DOE designed for a specific environment and imaging configuration.

Experimental Prototype

Figure 9:
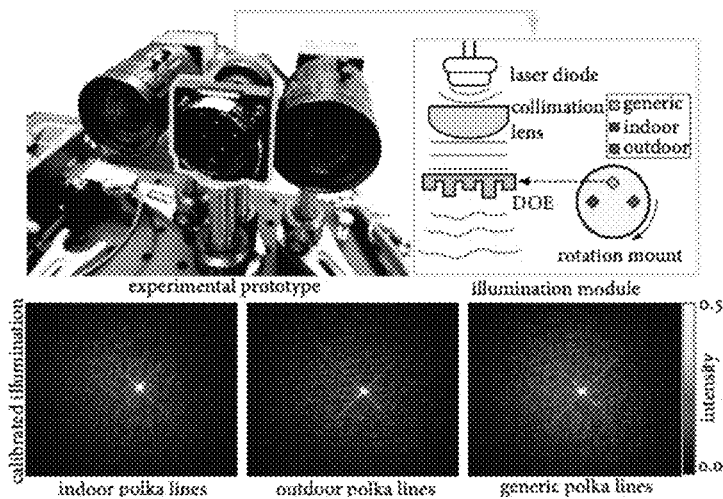
FIG. 9 is an image showing the proposed prototype system consisting of stereo NIR cameras and an illumination module, where laser light is collimated and modulated by a DOE according to an embodiment of the present disclosure.

FIG. 9 shows our experimental prototype system. The captures of the proposed Polka Lines illumination pattern variants using this prototype system. The proposed system contains two NIR cameras (Edmund Optics® 37-327) equipped with objective lenses of 6 mm focal length (Edmund Optics® 67-709). The pixel pitch of the cameras is 5.3 µm, and the stereo baseline is 55 mm. A NIR laser with a center wavelength 850 nm, and beam diameter of 1 mm was employed. A laser diode (Thorlabs® L850P200), a laser diode socket (Thorlabs® S7060R), a collimation lens (Thorlabs® LT200P-B), and a laser driver (Thorlabs® KLD101) were used. The optimized DOE was fabricated with a 16-level photolithography process.

Figure 13:
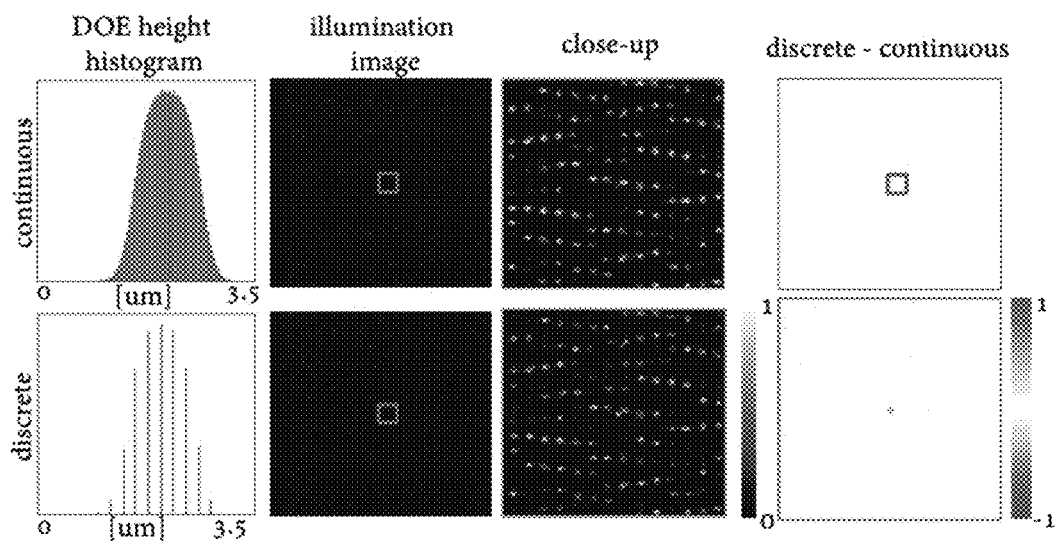
FIG. 13 is an image showing discretizing of the optimized DOE height into 16 levels for photolithography fabrication according to an embodiment of the present disclosure. In the simulation, the structure of the illumination image is maintained after the discretization process, except for the amplified zeroth-order diffraction.

With regard to the diffractive optical element, a conventional photolithography process from HoloOr was used to prototype three learned DOEs for different ambient light powers. As the four-step lithography that produces 16 discrete height levels was used, the continuous height maps of the learned DOEs were discretized into discrete versions. FIG. 13 shows the simulated illumination pattern before and after the discretization, demonstrating that the overall structure in the pattern remains the same except for the amplified zeroth-order diffraction. This zeroth-order diffraction pattern was also observed in the illumination image of the fabricated DOEs, which is partially handled by self-supervised fine-tuning. These fabrication inaccuracies could be mitigated in a commercial photolithography process, e.g., the Intel RealSense D415 pattern does not exhibit a zeroth-order inaccuracy. Moreover, the presently disclosed learned DOE design may be difficult to fabricate on a large scale due to its specialized structure. To remedy this, fabrication constraints could be incorporated into the proposed end-to-end design method.

Intel RealSense D415 was tested, but was shown not suitable for the presently disclosed method. While the exact stereo configuration is a system design choice, the parameters of the system in this test was chosen to match that of the Intel RealSense D415. Specifically, the camera focal lengths, sensor specs, and the baseline were chosen to match the ones of the Intel RealSense D415 camera. The illumination DOE Intel RealSense D415 was replaced with the improved DOE designs in the present disclosure. However, this was not practical because of the proprietary system design of Intel RealSense D415. Moreover, the illumination module in the present disclosure was also placed next to the Intel RealSense D415's stereo camera to enable effective active-stereo imaging using the highly-optimized camera of Intel RealSense D415. Unfortunately, this was also infeasible due to the required position of the illumination in between the stereo cameras which is unfortunately occupied by the Intel projector. Due to these challenges, an academic prototype with affordable elements was built from scratch.

The illumination pattern from the fabricated DOE exhibits undiffracted zeroth-order components that are superposed with the diffracted pattern. While commercial mass-market lithography is highly optimized, the presently disclosed small-batch manual lithography did not meet the same fabrication accuracy. Although the fabrication accuracy is below commercial DOEs with high diffraction efficiency, the measured illumination patterns match their synthetic counterparts.

Figure 8:
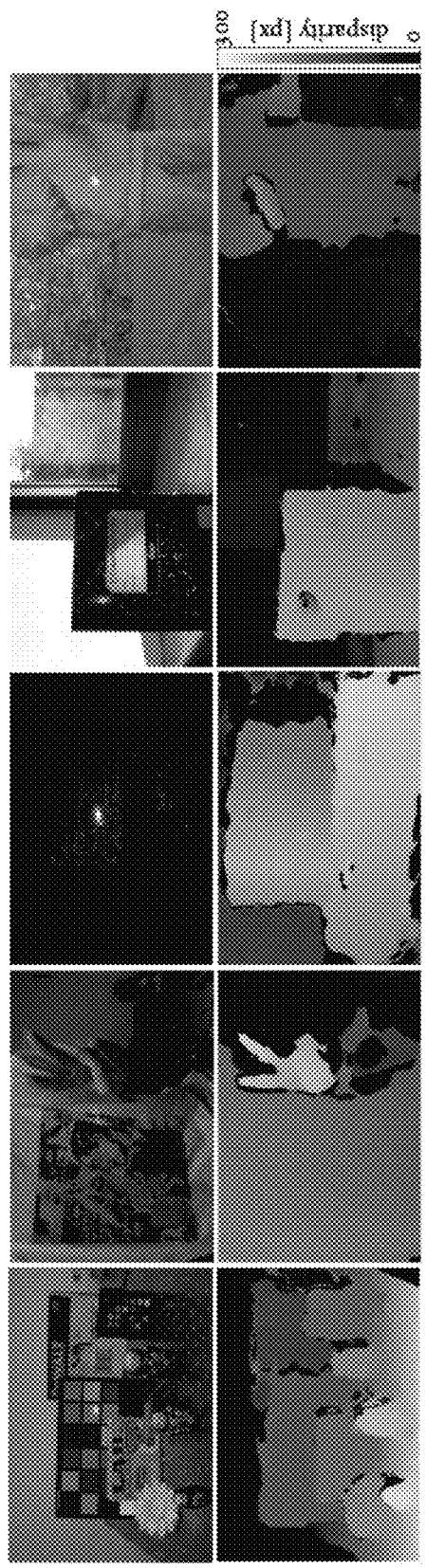
FIG. 8 is an image showing examples containing complex objects including textureless surfaces under diverse environments from indoor illumination to outdoor sunlight according to an embodiment of the present disclosure.
Figure 10:
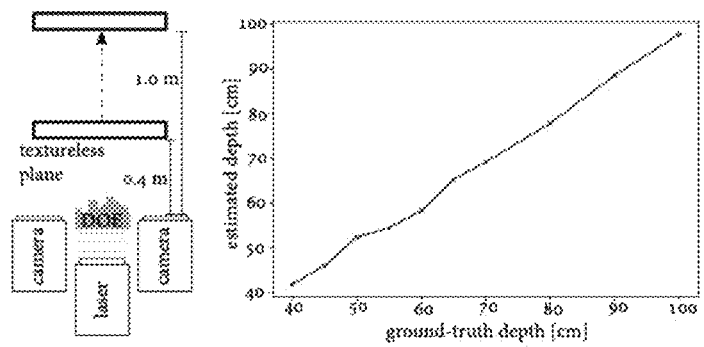
FIG. 10 is an image showing that the experimental prototype accurately reconstructs the depth of a textureless plane at distances from 0.4 m to 1.0 m according to an embodiment of the present disclosure.

The depth accuracy of the prototype system was measured by capturing planar textureless objects at known distances as shown in FIG. 10. The estimated depth using the Polka Lines pattern closely matches the ground truth, with a mean absolute error of 1.4 cm in the range from 0.4 m to 1 m. Qualitative results on diverse real-world scenes are shown in FIG. 8, which includes complex objects, dynamic hand movement, textureless objects without ambient light, objects in sunlight, and a moving person in dynamic outdoor environments.

Figure 11:
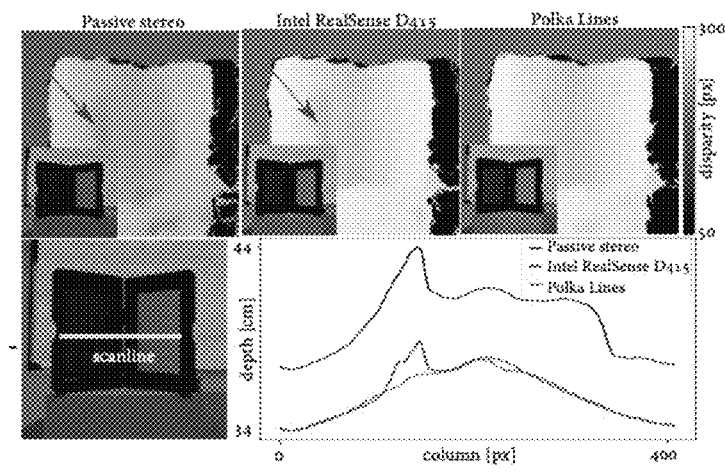
FIG. 11 is an image showing that the intensity dots out-perform passive stereo and the commercial hand-engineered pattern (Intel RealSense D415) for high dynamic range scene conditions, when capturing a V-shaped reflectance target (x-rite Pro Photo Kit) according to an embodiment of the present disclosure. Blue arrows indicate estimation artifacts.

The presently disclosed learned Polka Lines pattern was compared with the commercial Intel RealSense D415 pattern in FIG. 11. The average illumination intensity of the Intel pattern is adjusted to match that of the proposed system via radiometric calibration using an integrating sphere (Thorlabs® S142C).

FIG. 11 shows that the presently disclosed intensity-varying pattern is more robust to high dynamic range scenes than the Intel pattern, thanks to denser Polka dot patterns with a larger dynamic range.

In one embodiment, the experimental prototype was calibrated for efficient stereo matching in the rectified domain through geometric calibration. A checkerboard at different positions was captured, using which the camera intrinsics, the distortion coefficients, and the extrinsic between the stereo cameras were obtained. The average reprojection error was 0.6 pixels. For each input stereo frame, the stereo images were rectified using the calibration data and fed to the reconstruction network.

Then, the illumination images of the fabricated DOEs were obtained. For each DOE, a white wall was illuminated at a distance of 50 cm from the camera, while ensuring that the intensity of the illumination pattern is within the observable dynamic range of the stereo cameras. The stereo images of the wall were captured with and without the structured-light illumination. Using the no-illumination images as background, the illumination images at the stereo viewpoints were computed. Undistortion and rectification are applied to the illumination images. This procedure provides a high-quality illumination image at the rectified illumination viewpoint, which can be used for the reconstruction network.

In order to ensure a fair comparison between different illumination patterns, the same illumination power was used across different patterns. In synthetic experiments, this is achieved by using the same parameter value of the laser power $\beta$. For the Intel RealSense D415 pattern, the power-normalized illumination pattern was obtained to apply the laser power $\beta$. To this end, the optimal illumination power $\beta$ that reconstructs the captured Intel RealSense D415 pattern was estimated as:

$$\underset{\beta,\phi}{\text{minimize }} MSE(I_{illum}(\phi, \beta), I_{target}). \quad (13)$$

Once the optimization converges, the D415 illumination image was normalized with the estimated $\beta$. The same illumination power was used for its illumination image as the parameter value used for our end-to-end learning.

Figure 18:
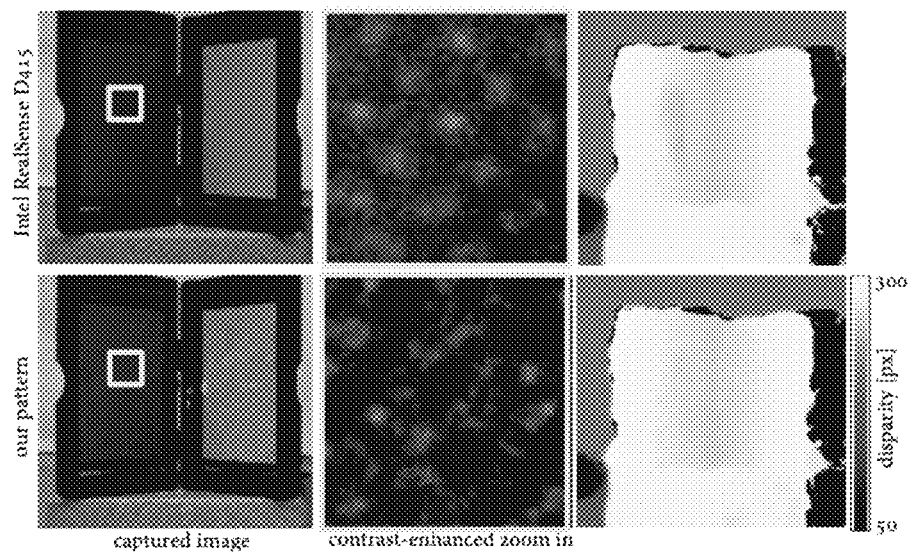
FIG. 18 is an image showing an enlargement of FIG. 11.

For real-world experiments, an integrating sphere of 12 mm input aperture (Thorlabs® S142C) was used to measure the average illumination power of the Intel RealSense D415 illumination and the presently disclosed illumination. The presently disclosed pattern exhibits higher peak power (not average power) than the Intel pattern, because the Intel RealSense D415 pattern has larger Gaussian-shaped dots while our pattern consists of smaller dots. FIG. 18 shows the zoom-ins of FIG. 11. Hence, for the same average power, the presently disclosed pattern features higher peak power with sparser dots.

Figure 12:
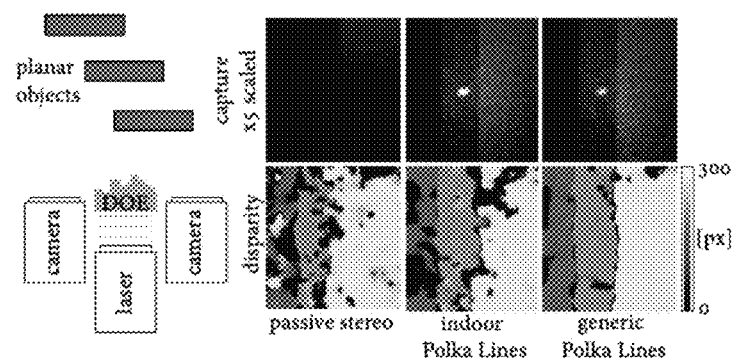
FIG. 12 is an image showing a scene with low-reflectance planar objects captured according to an embodiment of the present disclosure.

The Intel pattern is of high fabrication quality and does not exhibit a severe zeroth-order component (as does the presently disclosed fabricated DOE). The presently disclosed learned Polka Line variants for generic environments and indoor environments were validated in FIG. 12. The generic variant features a wide intensity range of dots, resulting in accurate reconstruction for low-reflectance objects. As shown in FIG. 12, while passive stereo suffers at the textureless surface, the proposed learned illumination enables effective depth reconstruction. The DOE learned for the generic environment contains a wider range of pattern intensities than the DOE learned for indoor scenes, enabling better depth estimation for these objects.

Figure 14:
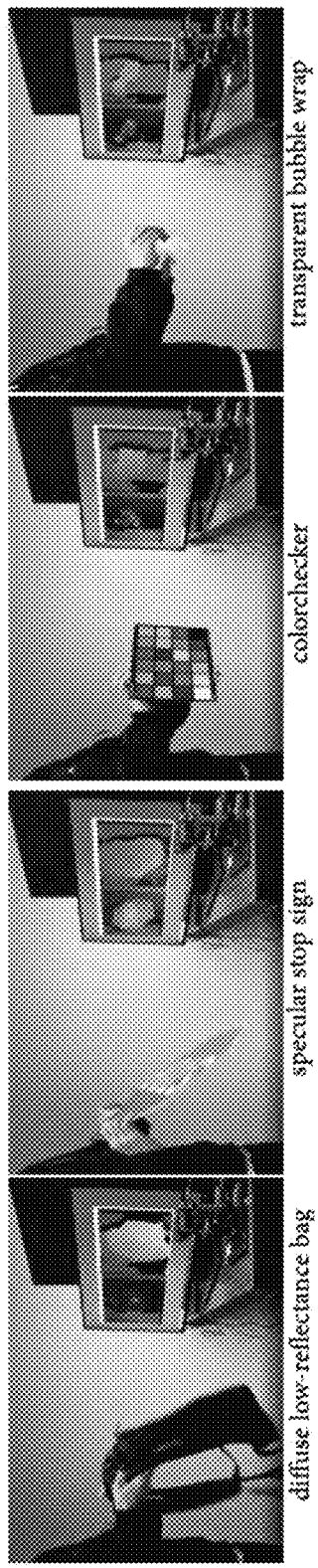
FIG. 14 is an image showing a real-time capture system from the Polka Lines prototype, reconstructing depth for several challenging objects in motion according to an embodiment of the present disclosure.

In one embodiment, a live-capture system that acquires stereo images and estimates a disparity map at 10 frames per second (FPS) was developed, as shown in FIG. 14. The target objects were a low-reflectance diffuse bag, a highly-specular red stop sign, a ColorChecker, and a transparent bubble wrap. Even though such diverse reflectance was not included in the training dataset, the reconstruction network together with the learned illumination enabled effective reconstruction of the objects. Temporal consistency between the estimated depth maps at different frames was observed without employing any temporal smoothing loss in the reconstruction network.

Figure 15:
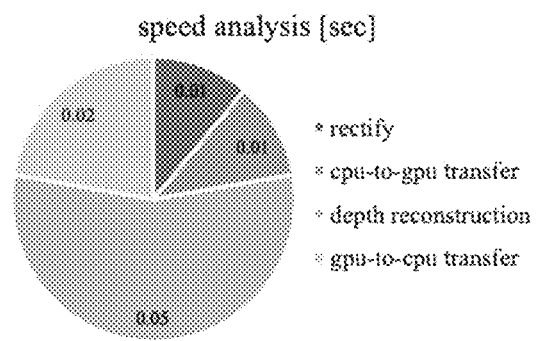
FIG. 15 is a graph showing the per-frame processing time for each stage of the live-capture program according to an embodiment of the present disclosure.

In this real-time/live-capture system, a desktop computer with an NVIDIA® GeForce RTX 3080 was used and the input 12-bit images were fed to the presently disclosed reconstruction network. The capture program is written in Python with multi-threaded programming for simultaneously capturing images and reconstructing a depth map. Specifically, the program consists of capturing the stereo images using the camera APIs, rectifying the images with the calibration data, and estimating a disparity map using our reconstruction network. To quantify the latency of the live-capture program, the elapsed time for each stage was measured by averaging over 50 frames. FIG. 15 shows the latency for each stage.

The current capture software may be further optimized. C++ implementation instead of the high-level Python API could provide speedup. Employing recent inference-dedicated network libraries such as NVIDIA® TensorRT can further reduce the inference time of the neural network.

Having described the many embodiments of the present disclosure in detail, it will be apparent that modifications and variations are possible without departing from the scope of the invention defined in the appended claims. Furthermore, it should be appreciated that all examples in the present disclosure, while illustrating many embodiments of the invention, are provided as non-limiting examples and are, therefore, not to be taken as limiting the various aspects so illustrated.

REFERENCES

The following references are referred to above and are incorporated herein by reference:

1. Intel®RealSenseTMDepthCameraD415 https://www.intelrealsense.com/depth-camera-d415/ Accessed Jun. 20, 2020.
2. udepth:Real-time3ddepthsensingonthepixe4. Accessed Sep. 19, 2020.
3. Martin Abadi, Ashish Agarwal, Paul Barham, Eugene Brevdo, Zhifeng Chen, Craig Citro, Greg S. Corrado, Andy Davis, Jeffrey Dean, Matthieu Devin, Sanjay Ghemawat, Ian Goodfellow, Andrew Harp, Geoffrey Irving, Michael Isard, Yangqing Jia, Rafal Jozefowicz, Lukasz Kaiser, Manjunath Kudlur, Josh Levenberg, Dandelion Mané, Rajat Monga, Sherry Moore, Derek Murray, Chris Olah, Mike Schuster, Jonathon Shlens, Benoit Steiner, Ilya Sutskever, Kunal Tal-war, Paul Tucker, Vincent Vanhoucke, Vijay Vasudevan, Fer-nanda Viégas, Oriol Vinyals, Pete Warden, Martin Watten-berg, Martin Wicke, Yuan Yu, and Xiaoqiang Zheng. Tensor-Flow: Large-scale machine learning on heterogeneous sys-tems, 2015.
4. Supreeth Achar, Joseph R Bartels, William L'Red' Whittaker, Kiriakos N Kutulakos, and Srinivasa G Narasimhan. Epipolar time-of-flight imaging. *ACM Transactions on Graphics (ToG)*, 36(4):1-8, 2017.
5. Brian F. Aull, Andrew H. Loomis, Douglas J. Young, Richard M. Heinrichs, Bradley J. Felton, Peter J. Daniels, and Deborah J. Landers. Geiger-mode avalanche photodiodes for three-dimensional imaging. 13(2):335-349, 2002.
6. Seung-Hwan Baek, Diego Gutierrez, and Min H Kim. Bire-fractive stereo imaging for single-shot depth acquisition. *ACM Transactions on Graphics*, 35(6):194, 2016.
7. Michael Bleyer, Christoph Rhemann, and Carsten Rother. Patchmatch stereo-stereo matching with slanted support win-dows. In *Bmvc*, volume 11, pages 1-11, 2011.
8. Ayan Chakrabarti. Learning sensor multiplexing design through back-propagation. In *Advances in Neural Informa-tion Processing Systems*, pages 3081-3089, 2016.

9. Julie Chang and Gordon Wetzstein. Deep optics for monoc-ular depth estimation and 3d object detection. In *IEEE Inter-national Conference on Computer Vision (ICCV)*, 2019.
10. H Dammann and K Görtler. High-efficiency in-line multi-ple imaging by means of multiple phase holograms. *Optics communications,* 3(5):312-315, 1971.
11. Pei-QinDu, Hsi-FuShih, Jenq-ShyongChen, and Yi-Shiang Wang. Design and verification of diffractive optical elements for speckle generation of 3-d range sensors. *Optical Review,* 23(6):1017-1025, 2016.
12. Sean Ryan Fanello, Julien Valentin, Christoph Rhemann, Adarsh Kowdle, Vladimir Tankovich, Philip Davidson, and Shahram Izadi. Ultrastereo: Efficient learning-based match-ing for active stereo systems. In 2017 *IEEE Conference on Computer Vision and Pattern Recognition (CVPR),* pages 6535-6544. IEEE, 2017.
13. Clément Godard, Oisin Mac Aodha, and Gabriel J Brostow. Unsupervised monocular depth estimation with left-right consistency. In *Proceedings of the IEEE Conference on Computer Vision and Pattern Recognition,* pages 270-279, 2017.
14. Joseph W Goodman. *Introduction to Fourier optics.* Roberts and Company Publishers, 2005.
15. Tobias Gruber, Frank Julca-Aguilar, Mario Bijelic, and Felix Heide. Gated2depth: Real-time dense lidar from gated images. In *Proceedings of the IEEE International Conference on Computer Vision,* pages 1506-1516, 2019.
16. Mohit Gupta, Qi Yin, and Shree K Nayar. Structured light in sunlight. In *Proceedings of the IEEE International Conference on Computer Vision,* pages 545-552, 2013.
17. Harel Haim, Shay Elmalem, Raja Giryes, Alex M Bronstein, and Emanuel Marom. Depth estimation from a single image using deep learned phase coded mask. *IEEE Transactions on Computational Imaging,* 4(3):298-310, 2018.
18. Miles Hansard, Seungkyu Lee, Ouk Choi, and Radu Patrice Horaud. *Time-of-flight cameras: principles, methods and applications.* Springer Science & Business Media, 2012.
19. Felix Heide, Steven Diamond, David B Lindell, and Gordon Wetzstein. Sub-picosecond photon-efficient 3d imaging using single-photon sensors. *Scientific reports,* 8(1):1-8, 2018.
20. Felix Heide, Wolfgang Heidrich, Matthias Hullin, and Gordon Wetzstein. Doppler time-of-flight imaging. *ACM Trans-actions on Graphics (ToG),* 34(4):1-11, 2015.
21. Steven Hickson, Stan Birchfield, Irfan Essa, and Henrik Christensen. Efficient hierarchical graph-based segmentation of RGBD videos. pages 344-351, 2014.
22. Heiko Hirschmuller. Stereo processing by semiglobal matching and mutual information. *IEEE Transactions on pattern analysis and machine intelligence,* 30(2):328-341, 2007.
23. Shahram Izadi, David Kim, Otmar Hilliges, David Molyneaux, Richard Newcombe, Pushmeet Kohli, Jamie Shotton, Steve Hodges, Dustin Freeman, Andrew Davison, et al. Kinectfusion: real-time 3D reconstruction and inter-action using a moving depth camera. In *Proceedings of the 24th annual ACM symposium on User interface software and technology,* pages 559-568, 2011.
24. Kaizhang Kang, Cihui Xie, Chengan He, Mingqi Yi, Minyi Gu, Zimin Chen, Kun Zhou, and Hongzhi Wu. Learning efficient illumination multiplexing for joint capture of reflectance and shape. *ACM Trans. Graph.,* 38(6):165-1, 2019.
25. Andreas Kolb, Erhardt Barth, Reinhard Koch, and Rasmus Larsen. Time-of-flight cameras in computer graphics. In *Computer Graphics Forum,* volume 29, pages 141-159. Wi-ley Online Library, 2010.
26. Adarsh Kowdle, Christoph Rhemann, Sean Fanello, Andrea Tagliasacchi, Jonathan Taylor, Philip Davidson, Mingsong Dou, Kaiwen Guo, Cem Keskin, Sameh Khamis, et al. The need 4 speed in real-time dense visual tracking. *ACM Trans-actions on Graphics (TOG),* 37(6):1-14, 2018.
27. Robert Lange. 3D time-of-flight distance measurement with custom solid-state image sensors in CMOS/CCD-technology. 2000.
28. Anat Levin, Rob Fergus, Frédo Durand, and William T Free-man. Image and depth from a conventional camera with a coded aperture. *ACM transactions on graphics (TOG),* 26(3):70-es, 2007.
29. Julio Marco, Quercus Hernandez, Adolfo Muñoz, Yue Dong, Adrian Jarabo, Min H Kim, Xin Tong, and Diego Gutierrez. Deeptof: off-the-shelf real-time correction of multipath interference in time-of-flight imaging. *ACM Transactions on Graphics (ToG),* 36(6):1-12, 2017.
30. Manuel Martinez and Rainer Stiefelhagen. Kinect unleashed: Getting control over high resolution depth maps. In *MVA,* pages 247-250, 2013.
31. N. Mayer, E. Ilg, P. Haüsser, P. Fischer, D. Cremers, A. Dosovitskiy, and T. Brox. A large dataset to train convolutional networks for disparity, optical flow, and scene flow estimation. In *IEEE International Conference on Computer Vision and Pattern Recognition (CVPR),* 2016. arXiv:1512.02134.
32. C. Metzler, H. Ikoma, Y. Peng, and G. Wetzstein. Deep op-tics for single-shot high-dynamic-range imaging. In *Proc. CVPR,* 2020.
33. Andreas Meuleman, Seung-Hwan Baek, Felix Heide, and Min H. Kim. Single-shot monocular rgb-d imaging using uneven double refraction. In *The IEEE Conference on Com-puter Vision and Pattern Recognition (CVPR),* June 2020.
34. Yinxiao Miao, Yongshun Zhao, Huiping Ma, Minwei Jiang, Jie Lin, and Peng Jin. Design of diffractive optical element projector for a pseudorandom dot array by an improved encoding method. *Applied Optics,* 58(34):G169—G176, 2019.
35. Elias Nehme, Daniel Freedman, Racheli Gordon, Boris Ferdman, Lucien E Weiss, Onit Alalouf, Reut Orange, Tomer Michaeli, and Yoav Shechtman. Deepstorm3d: dense three dimensional localization microscopy and point spread function design by deep learning. arXiv preprint arXiv: 1906.09957v2, 2019.
36. Bingbing Ni, Gang Wang, and Pierre Moulin. RGBD-HuDaAct: A color-depth video database for human daily activity recognition. In *Consumer Depth Cameras for Com-puter Vision,* pages 193-208. Springer, 2013.
37. Adam Paszke, Sam Gross, Soumith Chintala, Gregory Chanan, Edward Yang, Zachary DeVito, Zeming Lin, Al-ban Desmaison, Luca Antiga, and Adam Lerer. Automatic differentiation in pytorch. 2017.
38. Gernot Riegler, Yiyi Liao, Simon Donne, Vladlen Koltun, and Andreas Geiger. Connecting the dots: Learning repre-sentations for active monocular depth estimation. In *Pro-ceedings of the IEEE Conference on Computer Vision and Pattern Recognition,* pages 7624-7633, 2019.
39. Sean Ryan Fanello, Christoph Rhemann, Vladimir Tank-ovich, Adarsh Kowdle, Sergio Orts Escolano, David Kim, and Shahram Izadi. Hyperdepth: Learning depth from structured light without matching. In *Proceedings of the*

*IEEE Conference on Computer Vision and Pattern Recognition,* pages 5441-5450, 2016.
40. Daniel Scharstein and Richard Szeliski. A taxonomy and evaluation of dense two-frame stereo correspondence algo-rithms. *International journal of computer vision,* 47(1-3):7-42, 2002.
41. Daniel Scharstein and Richard Szeliski. High-accuracy stereo depth maps using structured light. volume 1, 2003.
42. John Sell and Patrick O'Connor. The xbox one system on a chip and kinect sensor. *IEEE Micro,* 34(2):44-53, 2014.
43. Vincent Sitzmann, Steven Diamond, Yifan Peng, Xiong Dun, Stephen Boyd, Wolfgang Heidrich, Felix Heide, and Gor-don Wetzstein. End-to-end optimization of optics and image processing for achromatic extended depth of field and super-resolution imaging. *ACM Transactions on Graphics (TOG),* 37(4):114, 2018.
44. Shuran Song, Samuel P Lichtenberg, and Jianxiong Xiao. Sun rgb-d: A rgb-d scene understanding benchmark suite. In *Proceedings of the IEEE conference on computer vision and pattern recognition,* pages 567-576, 2015.
45. Shuochen Su, Felix Heide, Gordon Wetzstein, and Wolfgang Heidrich. Deep end-to-end time-of-flight imaging. pages 6383-6392, 2018.
46. Qilin Sun, Ethan Tseng, Qiang Fu, Wolfgang Heidrich, and Felix Heide. Learning rank-1 diffractive optics for single-shot high dynamic range imaging. *IEEE CVPR,* 2020.
47. Quilin Sun, Jian Zhang, Xiong Dun, Bernard Ghanem, Yifan peng, and Wolfgang Heidrich. End-to-end learned, optically coded super-resolution spad camera. *ACM Transactions on Graphics (TOG),* 39, 2020.
48. Jan Turunen and Frank Wyrowski. *Diffractive optics for in-dustrial and commercial applications.* 1998.
49. Ralf Vandenhouten, Andreas Hermerschmidt, and Richard Fiebelkorn. Design and quality metrics of point patterns for coded structured light illumination with diffractive optical elements in optical 3d sensors. In *Digital Optical Technologies* 2017, volume 10335, page 1033518. International Society for Optics and Photonics, 2017.
50. Lizhi Wang, Tao Zhang, Ying Fu, and Hua Huang. Hyper-reconnet: Joint coded aperture optimization and image re-construction for compressive hyperspectral imaging. *IEEE Transactions on Image Processing,* 28(5): 2257-2270, May 2019.
51. George M. Williams. Optimization of eyesafe avalanche photodiode lidar for automobile safety and autonomous nav-igation systems. 56(3):1-9-9, 2017.
52. Jiamin Wu, Bo Xiong, Xing Lin, Jijun He, Jinli Suo, and Qionghai Dai. Snapshot hyperspectral volumetric microscopy. *Scientific Reports,* 6:24624, 2016.
53. Yicheng Wu, Vivek Boominathan, Huaijin Chen, Aswin Sankaranarayanan, and Ashok Veeraraghavan. Phasecam3d-learning phase masks for passive single view depth estimation. In *IEEE International Conference on Computational Photography (ICCP),* pages 1-12, 2019.
54. Yicheng Wu, Vivek Boominathan, Xuan Zhao, Jacob T Robinson, Hiroshi Kawasaki, Aswin Sankaranarayanan, and Ashok Veeraraghavan. Freecam3d: Snapshot structured light 3d with freely-moving cameras. In *European Conference on Computer Vision,* pages 309-325. Springer, 2020.
55. Yinda Zhang, Sameh Khamis, Christoph Rhemann, Julien Valentin, Adarsh Kowdle, Vladimir Tankovich, Michael Schoenberg, Shahram Izadi, Thomas Funkhouser, and Sean Fanello. Activestereonet: End-to-end self-supervised learn-ing for active stereo systems. In *Proceedings of the Euro-pean Conference on Computer Vision (ECCV),* pages 784-801, 2018.
56. Zhengyou Zhang. A flexible new technique for camera cali-bration. *IEEE Transactions on pattern analysis and machine intelligence,* 22(11):1330-1334, 2000.
57. Tinghui Zhou, Matthew Brown, Noah Snavely, and David G Lowe. Unsupervised learning of depth and ego-motion from video. In *Proceedings of the IEEE Conference on Computer Vision and Pattern Recognition,* pages 1851-1858, 2017.

All documents, patents, journal articles and other materials cited in the present application are incorporated herein by reference.

While the present disclosure has been disclosed with references to certain embodiments, numerous modification, alterations, and changes to the described embodiments are possible without departing from the sphere and scope of the present disclosure, as defined in the appended claims. Accordingly, it is intended that the present disclosure not be limited to the described embodiments, but that it has the full scope defined by the language of the following claims, and equivalents thereof.

What is claimed is:

1. A method for generating optimal structured illumination patterns for 3D imaging, comprising:
    modeling a projected illumination pattern;
    simulating stereo images;
    reconstructing a 3D scene,
        wherein the modeling of the projected illumination pattern and the reconstructing of the 3D scene are joint in an end-to-end fashion,
        wherein the modeling of the projected illumination pattern uses a differentiable image formation model comprising at least one illumination module, at least two stereo cameras, and at least one diffractive optical element (DOE),
        wherein the reconstructing of the 3D scene uses a trinocular reconstruction network, wherein at least two baseline configurations are considered by the trinocular reconstruction network.

2. The method of claim 1, wherein the differentiable image formation model relies on both wave and geometric optics.

3. The method of claim 1, wherein at least one illumination input and at least one camera input are generated during the modeling of the projected illumination pattern.

4. The method of claim 1, wherein the trinocular reconstruction network reconstructs a depth map by exploiting at least one illumination input and at least one camera input.

5. The method of claim 4, wherein the at least one illumination input are known illumination patterns.

6. The method of claim 1, further comprising:
    computing a reconstruction loss between an estimated and ground-truth depth; and
    backpropagating the reconstruction loss to a formation model and a reconstruction network.

7. A system for generating optimal structured illumination patterns for 3D imaging, comprising:
    a differentiable image formation model; and
    a trinocular reconstruction network, wherein the differentiable image formation model and the trinocular reconstruction network function jointly in an end-to-end fashion, wherein the differentiable image formation model comprises at least one illumination module, at least two stereo cameras, and at least one diffractive optical element (DOE), wherein at least two baseline configurations are considered by the trinocular reconstruction network.

8. The system of claim 5, wherein the differentiable image formation model is configured to rely on both wave and geometric optics.

9. The system of claim 5, wherein the trinocular reconstruction network is configured to reconstruct a depth map by exploiting illumination patterns being optimized.

10. The system of claim 9, wherein the illumination patterns patters-being optimized are known.

11. The system of claim 5, further comprising: a module configured to compute a reconstruction loss between an estimated ground-truth depth and backpropagate the reconstruction loss to the differentiable image formation model and the trinocular reconstruction network.

12. The system of claim 5, wherein the DOE is disposed in front of the illumination module.

13. The system of claim 5, wherein the illumination module is a laser diode.

14. The system of claim 13, wherein the differentiable image formation model is configured to generate illumination images using the laser diode and generate camera images using the stereo cameras.

15. The system of claim 14, wherein the generation of illumination images using the laser diode relies on wave optics and the generation of camera images using the stereo cameras relies on geometric optics.

16. The system of claim 5, wherein the trinocular reconstruction network is configured to reconstruct a depth map by exploiting known illumination patterns being optimized.

17. The system of claim 5, wherein the trinocular reconstruction network reconstructs a depth map by exploiting the illumination images.

18. The system of claim 17, wherein the illumination images are known illumination patterns.

19. The system of claim 7, wherein the at least two baseline configurations are a narrow-baseline configuration between the illumination module and either of the at least two stereo cameras, and one wide-baseline pair consisting of the at least two stereo cameras.

* * * * *